US011562170B2

(12) United States Patent
Edge et al.

(10) Patent No.: US 11,562,170 B2
(45) Date of Patent: Jan. 24, 2023

(54) MODELING HIGHER-LEVEL METRICS FROM GRAPH DATA DERIVED FROM ALREADY-COLLECTED BUT NOT YET CONNECTED DATA

(71) Applicant: Microsoft Technology Licensing, LLC, Redmond, WA (US)

(72) Inventors: Darren K. Edge, Cambridge (GB); Jonathan K. Larson, Seattle, WA (US); Nathan R. Evans, Bremerton, WA (US); Christopher M. White, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 16/511,784

(22) Filed: Jul. 15, 2019

(65) Prior Publication Data

US 2021/0019558 A1 Jan. 21, 2021

(51) Int. Cl.
*G06K 9/62* (2022.01)
*G06F 16/245* (2019.01)
(Continued)

(52) U.S. Cl.
CPC ......... *G06K 9/6224* (2013.01); *G06F 16/245* (2019.01); *G06F 16/285* (2019.01); *G06N 3/02* (2013.01); *G06V 20/41* (2022.01)

(58) Field of Classification Search
CPC .. G06F 16/2465; G06F 16/245; G06F 16/285; G06F 16/9024; G06K 9/0718; G06K 9/6224; G06N 3/02
See application file for complete search history.

(56) References Cited

U.S. PATENT DOCUMENTS 9,135,653 B2 9/2015 Vaynblat et al.
9,979,675 B2 5/2018 Patil et al.
(Continued)

OTHER PUBLICATIONS

"International Search Report and Written Opinion Issued in PCT Application No. PCT/US2020/034720", dated Oct. 20, 2020, 14 Pages.

(Continued)

*Primary Examiner* — Etienne P Leroux
(74) *Attorney, Agent, or Firm* — Ranjeev Singh; Singh Law, PLLC

(57) ABSTRACT

Systems and methods for modeling higher-level metrics from graph data derived from already-collected but not yet connected data are disclosed. A method includes extracting a first set of actor-related data, a second set of object-related data, and a third set of temporal data from the set of the already-collected but not yet connected data representative of a unit-level contribution to the target activity. The method further includes generating graph data for a graph using the set of the already-collected but not yet connected data, where each of the plurality of nodes of the graph corresponds to the actor or the object, and where an attribute associated with each of the plurality of edges of the graph corresponds to a measurement associated with the target activity. The method further includes modeling a relationship between graph attributes associated with the graph data and a higher-level metric associated with the target activity.

20 Claims, 21 Drawing Sheets

(51) Int. Cl.

| | |
|---|---|
| ***G06F 16/28*** | (2019.01) |
| ***G06N 3/02*** | (2006.01) |
| ***G06V 20/40*** | (2022.01) |

(56) References Cited

U.S. PATENT DOCUMENTS

| | | | | |
|---|---|---|---|---|
| 10,262,079 | B1 | 4/2019 | Costabello et al. | |
| 2005/0027666 | A1* | 2/2005 | Beck | G06Q 30/02 |
| 2005/0220039 | A1* | 10/2005 | Hoshino | H04L 63/083 370/261 |
| 2011/0246560 | A1 | 10/2011 | Gibson | |
| 2011/0270853 | A1* | 11/2011 | Curbera | G06F 16/9024 707/755 |
| 2012/0324027 | A1 | 12/2012 | Vaynblat et al. | |
| 2013/0073568 | A1* | 3/2013 | Federov | G06Q 30/0269 707/749 |
| 2013/0073979 | A1 | 3/2013 | Shepherd et al. | |
| 2013/0073983 | A1 | 3/2013 | Rasmussen et al. | |
| 2014/0046982 | A1 | 2/2014 | Chan et al. | |
| 2014/0071135 | A1* | 3/2014 | Morsi | G06T 11/206 345/440 |
| 2015/0127677 | A1 | 5/2015 | Wang et al. | |
| 2016/0072748 | A1* | 3/2016 | Saar | H04W 4/029 455/414.1 |
| 2016/0125005 | A1 | 5/2016 | Savkli et al. | |
| 2016/0203510 | A1 | 7/2016 | Pregueiro | |
| 2016/0350389 | A1 | 12/2016 | Kloke et al. | |
| 2017/0048174 | A1 | 2/2017 | Charignon | |
| 2017/0262868 | A1 | 9/2017 | Manjunath et al. | |
| 2017/0330080 | A1 | 11/2017 | Lindsley | |
| 2017/0357566 | A1* | 12/2017 | Delwood | G06F 11/3664 |
| 2018/0157568 | A1 | 6/2018 | Wagner | |
| 2018/0210927 | A1 | 7/2018 | Karam et al. | |
| 2018/0365155 | A1 | 12/2018 | Bryc | |
| 2018/0375886 | A1* | 12/2018 | Kirti | H04L 63/104 |
| 2019/0028534 | A1* | 1/2019 | Bloomquist | G06Q 10/10 |
| 2019/0158524 | A1 | 5/2019 | Zadeh et al. | |
| 2020/0287923 | A1 | 9/2020 | Raghavendra et al. | |
| 2020/0401908 | A1 | 12/2020 | Ortega et al. | |
| 2021/0019325 | A1 | 1/2021 | Edge et al. | |

OTHER PUBLICATIONS

"Building a Mobile Gaming Analytics Platform—a Reference Architecture", Retrieved from: https://web.archive.org/web/20180526141059/https:/cloud.google.com/solutions/mobile/mobile-gaming-analysis-telemetry, May 26, 2018, 12 Pages.

"Data lifecycle", Retrieved from: https://web.archive.org/web/20161115102507/https:/cloud.google.com/solutions/data-lifecycle-cloud-platform, Nov. 15, 2016, 29 Pages.

"Project Essex", Retrieved from: https://essexwiki.azurewebsites.net/, Retrieved Date: Mar. 6, 2019, 6 Pages.

Cai, et al., "A Comprehensive Survey of Graph Embedding: Problems, Techniques and Applications", In Journal of IEEE Transactions on Knowledge and Data Engineering, Sep. 2017, pp. 1-20.

Kobielus, James, "Grasping How Graph Fits Microsoft's Intelligent Edge Strategy", Retrieved from: https://wikibon.com/grasping-how-graph-fits-microsofts-intelligent-edge-strategy/. May 12, 2017, 4 Pages.

"International Search Report and Written Opinion Issued in PCT Application No. PCT/US2020/035800", dated Sep. 22, 2020, 12 Pages.

"Non Final Office Action Issued in U.S. Appl. No. 16/511,722", dated Nov. 3, 2021, 12 Pages.

"Non Final Office Action Issued in U.S. Appl. No. 16/511,722", dated Feb. 18, 2022, 12 Pages.

"Final Office Action Issued in U.S. Appl. No. 16/511,722", dated Jul. 6, 2022, 10 Pages.

* cited by examiner

100

300

500

600

FIG. 10
1012
1010
Mercedes-Benz® (Official) | The Spring Event Is Here
View Inventory
Find A Dealer
Automobili Lamborghini - Official Website | Lamborghini.com
Models
Urus
Lamborghini
See lamborghini
1014
Lamborghini - Wikipedia
Lamborghini Bellevue
2019 Lamborghini Cars | Models and Prices | Car and Driver
Open
1016

1000

1100

1300

1400

1500

1800

2100

MODELING HIGHER-LEVEL METRICS FROM GRAPH DATA DERIVED FROM ALREADY-COLLECTED BUT NOT YET CONNECTED DATA

BACKGROUND

Aggregated data related to the users' activities can provide greater insights than the data related to an individual user's activities. The collection of such data, however, may still incur runtime costs above and beyond those necessary for the normal operation of the system.

Moreover, the analysis of the collected data may include techniques that focus on metrics that do not accurately capture the complexity of the user's activities and their contribution to the value of such metrics. As an example, analyzing collected data through attribute-based aggregations (e.g., sums, counts, or averages) elides the interdependence of users' actions and the importance of structural relationships.

SUMMARY

In one example, the present disclosure relates to a method implemented by a system comprising at least one processor and at least one memory. The method may include collecting data for a target activity relating to an actor or an object during normal operation of a cloud computing platform to generate a set of already-collected but not yet connected data and storing the set of the already-collected but not yet connected data in the at least one memory. The method may further include using the at least one processor, extracting at least one of a first set of actor-related data, a second set of object-related data, and a third set of temporal data from the set of the already-collected but not yet connected data representative of a unit-level contribution to the target activity. The method may further include using the at least one processor, generating graph data for at least one graph having a plurality of nodes and a plurality of edges using the set of the already-collected but not yet connected data, where each of the plurality of nodes corresponds to the actor or the object, and where an attribute associated with each of the plurality of edges corresponds to a measurement associated with the target activity during a temporal dimension of interest. The method may further include using the at least one processor, converting the graph data into metric space data using a graph embedding process and storing the metric space data in the at least one memory.

In another example, the present disclosure relates to a method implemented by a system comprising at least one processor and at least one memory. The method may include collecting data for a target activity relating to an actor or an object to generate a set of already-collected but not yet connected data and storing the set of the already-collected but not yet connected data in the at least one memory. The method may further include using the at least one processor, extracting a set of actor-related data from the set of the already-collected but not yet connected data representative of a unit-level contribution to the target activity. The method may further include using the at least one processor, generating graph data for at least one graph having a plurality of nodes and a plurality of edges using the set of the already-collected but not yet connected data, where each of the plurality of nodes corresponds to the actor, and where an attribute associated with each of the plurality of edges corresponds to a measurement associated with the target activity during a temporal dimension of interest. The method may further include using the at least one processor, converting the graph data into metric space data using a graph embedding process and storing the metric space data in the at least one memory.

In yet another example, the present disclosure relates to a system comprising at least one processor and at least one memory. The at least one memory may include instructions configured to, when executed by the at least one processor, collect data for a target activity relating to an actor or an object to generate a set of already-collected but not yet connected data and storing the set of the already-collected but not yet connected data in the at least one memory. The at least one memory may further include instructions configured to, when executed by the at least one processor, extract a set of actor-related data from the set of the already-collected but not yet connected data representative of a unit-level contribution to the target activity. The at least one memory may further include instructions configured to, when executed by the at least one processor, generate graph data for at least one graph having a plurality of nodes and a plurality of edges using the set of the already-collected but not yet connected data, where each of the plurality of nodes corresponds to the actor, and where an attribute associated with each of the plurality of edges corresponds to a measurement associated with the target activity during a temporal dimension of interest. The at least one memory may further include instructions configured to, when executed by the at least one processor, convert the graph data into metric space data using a graph embedding process and storing the metric space data in the at least one memory.

In another example, the present disclosure relates to a method implemented by a system comprising at least one processor and at least one memory. The method may include collecting data for a target activity relating to an actor or an object during normal operation of a cloud computing platform to generate a set of already-collected but not yet connected data and storing the set of the already-collected but not yet connected data in the at least one memory. The method may further include using the at least one processor, extracting at least one of a first set of actor-related data, a second set of object-related data, and a third set of temporal data from the set of the already-collected but not yet connected data representative of a unit-level contribution to the target activity. The method may further include using the at least one processor, generating graph data for at least one graph having a plurality of nodes and a plurality of edges using the set of the already-collected but not yet connected data, where each of the plurality of nodes corresponds to the actor or the object, and where an attribute associated with each of the plurality of edges corresponds to a measurement associated with the target activity during a temporal dimension of interest. The method may further include using the at least one processor, modeling a relationship between graph attributes associated with the graph data and at least one higher-level metric associated with the target activity.

In another example, the present disclosure relates to a method implemented by a system comprising at least one processor and at least one memory. The method may include collecting data for a target activity relating to an actor or an object to generate a set of already-collected but not yet connected data and storing the set of the already-collected but not yet connected data in the at least one memory. The method may further include using the at least one processor, extracting a set of actor-related data from the set of the already-collected but not yet connected data representative of a unit-level contribution to the target activity. The method may further include using the at least one processor, generating graph data for at least one graph having a plurality of nodes and a plurality of edges using the set of the already-collected but not yet connected data, where each of the plurality of nodes corresponds to the actor, and where an attribute associated with each of the plurality of edges corresponds to a measurement associated with the target activity during a temporal dimension of interest. The method may further include using the at least one processor, modeling a relationship between graph attributes associated with the graph data and at least one higher-level metric associated with the target activity.

In yet another example, the present disclosure relates to a system comprising at least one processor and at least one memory. The at least one memory may include instructions configured to, when executed by the at least one processor, collect data for a target activity relating to an actor or an object to generate a set of already-collected but not yet connected data and storing the set of the already-collected but not yet connected data in the at least one memory. The at least one memory may further include instructions configured to, when executed by the at least one processor, extract a set of actor-related data from the set of the already-collected but not yet connected data representative of a unit-level contribution to the target activity. The at least one memory may further include instructions configured to, when executed by the at least one processor, generate graph data for at least one graph having a plurality of nodes and a plurality of edges using the set of the already-collected but not yet connected data, where each of the plurality of nodes corresponds to the actor, and where an attribute associated with each of the plurality of edges corresponds to a measurement associated with the target activity during a temporal dimension of interest. The at least one memory may further include instructions configured to, when executed by the at least one processor, model a relationship between graph attributes associated with the graph data and at least one higher-level metric associated with the target activity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
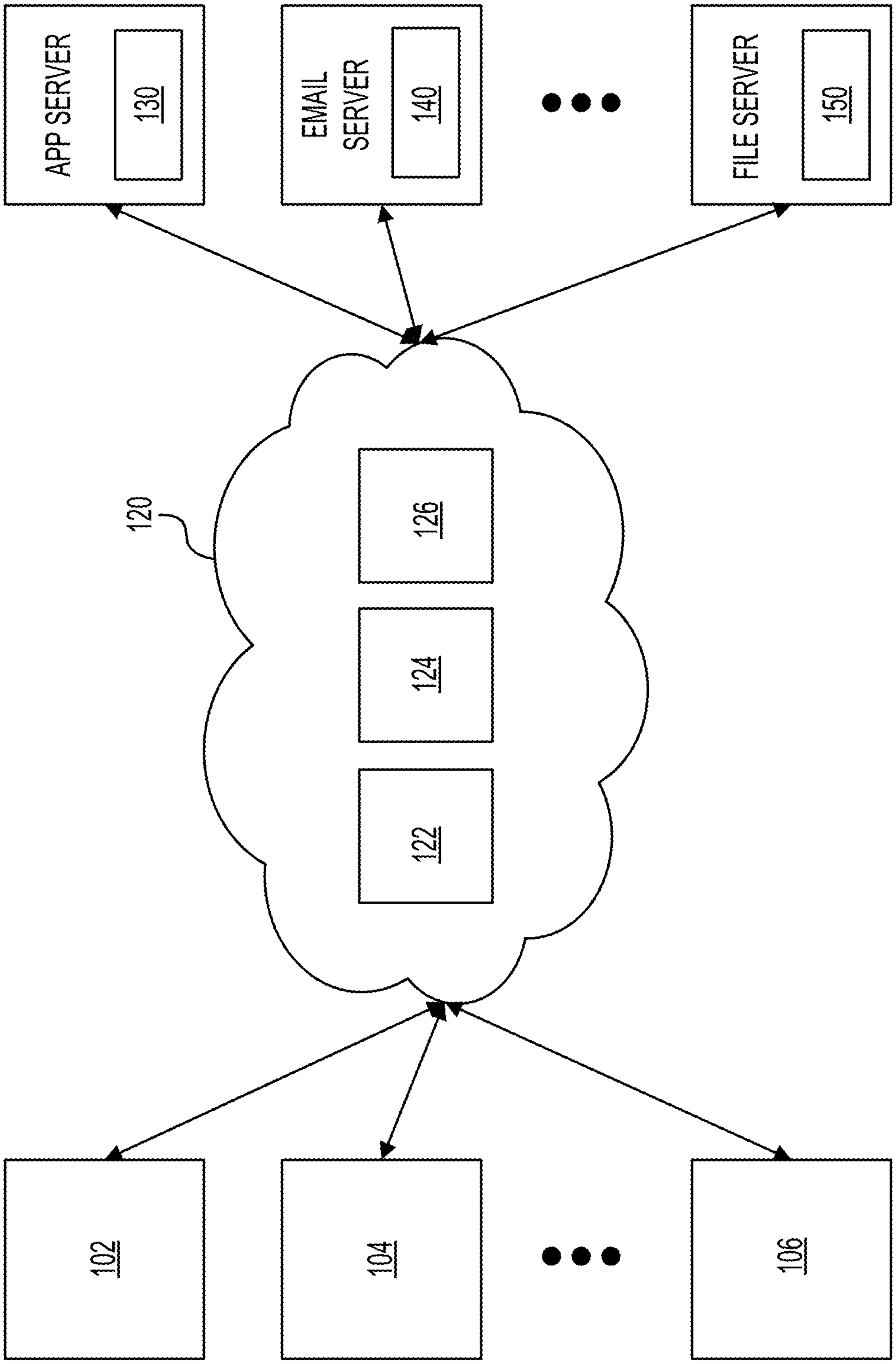
FIG. 1 shows a diagram of a system environment for collecting data in accordance with one example.

Examples described in this disclosure relate to graph embedding already-collected but not yet connected data. Additional examples relate to applying machine learning to the graph embedding related methods. Certain examples in the present disclosure relate to interpreting, diagnosing, predicting, and acting on metrics by modeling activity of interest as a graph. Such graphs enable automated inference and interactive exploration of the key relationships between the structure of activity and the high-level metrics that measure certain outcomes. Compared with the common practice of monitoring metric averages over time, the methods and the systems described in the present disclosure reveal actionable insights into how to transform the structure, dynamics, and outcomes of activity for the better.

Traditionally, entities have used metrics to abstract the low-level details of business-related activity into high-level indicators of performance. Such activity of interest may be internal to the entity (e.g., rates of production), external to the entity (e.g., rates of social media mentions), or at the boundary of the entity and its customers, clients, or users (e.g., rates of service use). The reduction of such activity to high-level metrics such as numerical averages ignores the connected structure and temporal dynamics of activity as captured by high-fidelity logging (e.g., through cloud-based instrumentation and telemetry). This is a problem because the use of averaging can be both inappropriate and insufficient for a user's needs.

While such averaging may be appropriate when the activity of interest is independent and identically distributed, this is rarely the case. For many activities, the actors in an activity system comprise a network and are subject to network effects (e.g., positive network externalities in which each additional actor confers benefits to the existing actor base). Actors are more likely to influence their direct connections than more distant nodes, leading to concentrated rather than dispersed effects. The resulting interdependence of actions violates the assumption of independence. Similarly, the Pareto principle that characterizes the distribution of activity outcomes—that 80% of the effects come from 20% of the causes (e.g., the actions of actors)—conflicts with the assumption that activity is identically distributed across the population. Averages can also mask significant variation in activity over time, e.g., a stable number of active users can result from both a stable user population and a high-growth, high-churn dynamic resulting in a similar-sized population of ever-changing users over time.

In addition to masking the underlying variation in activity, metric averages only measure activity outcomes and not the interconnectedness of the actions that contribute to those outcomes (e.g., as in the viral spread of ideas or the diffusion of product adoption). Without an analytic model of connected activity in terms of both its topological and temporal structure, it may not be possible to diagnose the specific cause of a given metric value or to infer general relationships between high-level metrics and low-level qualities of the underlying activity. Such understanding is critical for determining how to intervene in ways that might transform the structure of activity, and thereby the metric, for the better. Example interventions that operationalize the results of analysis include offering subsidies and other incentives to improve sales metrics, running campaigns targeting specific influencers to improve marketing metrics, and changing organizational structure to improve collaboration metrics.

This problem is a general one, applying to all metrics where activity is reduced to averages across four classes of socio-economic activity—interaction, production, consumption, and exchange. Examples include interaction metrics like the number of messages sent and received; production metrics like the number of tasks completed or products manufactured; consumption metrics like the number of articles read or videos watched; and exchange metrics like the number or value of transactions completed. In other words, it affects any business that uses metrics to set goals, track performance, and make strategic decisions.

A key use case in which metric averages may be used to describe complex patterns of connected activity is for businesses offering cloud-based software as a service (SaaS) via subscription or freemium business models. Such businesses use engagement metrics to track the scale, stickiness, and attrition of service usage. Scale metrics are those that measure the number of active users over various time periods, such as Daily Active Users (DAU), Weekly Active Users (WAU), and Monthly Active Users (MAU). Stickiness metrics examine ratios of scale metrics to show how often users return to the service; for example, a DAU/MAU ratio of 0.25 can be interpreted as users engaging with the service on one day out of four on average. Attrition metrics are measured as user retention percentages over various time periods (e.g., Day 1, Day 2, Week 1). These metrics are all averages, yet for many such businesses, users become and remain active in ways that depend on one another individually (e.g., interacting with specific users) and collectively (e.g., leveraging community-generated content). The resulting activity networks are often fundamental to business success, but the successful growth and maintenance of these networks is often dependent on a small proportion of "influencer" users who are frequently active and highly connected (following the Pareto principle). A new class of structured metrics—e.g., relating the number, ratio, and lifetime of active users to their community participation or proximity to influencers—would help businesses to understand not just how their metrics vary and why, but how their metrics could be transformed for the better by intervening in the activity.

Certain examples of the present disclosure relate to modeling business-related activity as the connected actions of interdependent actors and to characterizing the structure and dynamics of activity in graph-theoretic terms. Graphs (otherwise known as networks or topologies) are fundamental mathematical structures that model pairwise relationships between objects. They are comprised of nodes (otherwise known as vertices or points) connected by edges (otherwise known as links or arcs). Families of graphs include heterogeneous graphs with multiple node types; multivariate graphs with multiple edge types; attributed graphs with attributes associated with nodes; weighted graphs with numerical edge attributes representing the degree of relatedness between linked nodes; dynamic graphs with temporal edge attributes representing the onset and duration of relationships between linked nodes; directed graphs with explicit edge directions from source to target nodes; and undirected graphs with edges equivalent in both directions. Any given graph can contain elements from multiple such families.

In the examples associated with the present disclosure, the actions of actors are represented as edges in a graph that connect nodes (representing the actors performing those actions and the objects being acted upon). Such edges are necessarily directed because the actor is performing the action on the object and not vice-versa. The resulting graph is also heterogeneous in structure, representing relations between two distinct types of nodes (actors and objects). For many forms of analysis, however, it is beneficial to operate on an undirected graph structure showing relations between nodes of only a single target type (e.g., actors or objects, but not both). This can be achieved by creating a new graph containing all nodes of the target type from the source graph, with edges connecting all pairs of target nodes that share a connection to a non-target node and edge weights representing the frequency (or other aggregation) of such connections.

This approach can be used to project activity logs into actor-graphs or object-graphs that encode the frequency of pairwise actions between nodes of a single type. When rendered, such graphs can be qualitatively decomposed into distinctive patterns of relationships with meaningful business interpretation (e.g., related people/services that might be targeted as a group). Use of graph-theoretic techniques to automatically identify such meaningful substructures allows for the segmentation of high-level metrics into dynamic cohorts of actors, actions, or objects. This in turn allows for the tracing of variation in high-level metrics to individual substructures and the diagnosis of these substructures as being the likely cause of the observed variation.

Each kind of substructure can itself be described using a range of graph-theoretic attributes corresponding to its size, shape, strength, and quality. These attributes allow general relationships between activity structure and activity outcomes to be inferred; for example, through machine learning, AI, or other forms of statistical inference. Such inferred relationships, grounded in data, provide actionable suggestions for experimental interventions aiming to transform both the structure and the metrics of the activity for the better. The success of these interventions can then inform business strategy and direct the allocation of larger-scale business investments.

Example graph-theoretic structures, their associated attributes, and the implied interventions are paths, connected components, communities, and cliques. In a path of nodes, each successive node is reachable by following an edge from the previous node. The relationship between a pair of nodes may be characterized by the length of the shortest path between them or the number of distinct connecting paths of various lengths. The relationship between a pair of paths can similarly be characterized by the degree of separation or overlap between them. Possible interventions include incentives to reduce the shortest paths between nodes known to be related or increasing the number of distinct paths between them.

In a connected component of nodes, every node is reachable from every other node by following the edges of a path. The size of a connected component may be measured by its number of nodes or edges and its shape by its diameter (maximum eccentricity) and radius (minimum eccentricity), where the eccentricity of each node is its maximum distance from any other node. Possible interventions include incentivizing edges that bridge "disconnected" components to create a larger, single connected component, or which "round out" the component by reducing the maximum distance between nodes.

In a community of nodes, there is a relatively greater density of edges among nodes inside the community than to nodes outside the community. The quality of a community partition of a graph is conventionally measured using the modularity function (the proportion of the edges that fall within the given communities minus the expected proportion if edges were distributed at random) and the strength of the community by the average clustering coefficient of its nodes (the proportion of each node's connections that are connected to one another, out of all possible connections). Possible interventions include incentives to create missing connections within communities or to bridge closely related communities. Different community detection algorithms (e.g., Louvain, VOS, and embedding plus clustering methods) may detect communities with different characteristics, such as partitioning the center and periphery of a graph versus two distinct sides (e.g., in graphs of brain connectivity).

In a clique of nodes, each node is connected to each other node forming a fully-connected pattern of $N(N-1)/2$ edges, where N is the size of the clique. Possible interventions include incentivizing edges that complete cliques by filling in missing edges, and growing cliques by connecting new nodes to all existing nodes. The technique of link prediction may also be used to prioritize edges for targeting.

The same set of predictive graph techniques may be used in all instances to help identify and prioritize relations of interest. For example, vertex nomination may be used to assign new nodes to existing communities based on their attributes, link prediction may be used to prioritize the addition of edges to paths, communities, or sub-cliques, graph matching may be used to suggest clique expansion or the structural isomorphism of connected components, and dynamics forecasting may be used to predict future temporal dynamics based on historical activity.

The same graph-theoretic substructures and attributes that allow decomposition of metrics within a time period also allow comparison across periods. Techniques here include creating a time series of graph representations—each graph describing a time window such as a day or week—and charting the variation in attributes and metrics both by substructure and over time. Such approaches help to reveal trends, cycles, and anomalies that may otherwise be masked by averaging over the whole time period. Graphs from selected time windows may be compared side-by-side by visually encoding nodes and edges (e.g., using a color key) based on the subset of time windows in which they occur. The same encoding scheme may be applied to the graph spanning multiple time periods of interest such that dynamic activity may be represented in a single, static graph. Alternative encoding schemes may highlight different aspects of dynamic activity, e.g., coloring nodes and edges using a linear color scale based on their first or last appearance, or the proportion of time windows in which they occur.

Certain examples described herein are a form of activity-based segmentation observed through the evidence of connected actions within a population of interdependent actors (e.g., obtained through telemetry, instrumentation, logging, crawling, etc.). Actions and actors/objects are modeled as the edges and nodes of a directed graph respectively, typically with projection into undirected graphs with weights corresponding to the strength of joint activity. Graph-theoretic attributes of the resulting graph structures (e.g., the modularity of a partitioning of the graph into communities of related nodes) are used to define the activity-based segmentation.

Certain other examples relate to using activity-based segmentation to reveal topological and temporal variations in high-level metrics like daily average users (DAU) and monthly active users (MAU). Such structured metrics allow drilldown into connected cohorts of actors or objects and their patterns of activity over time. The result is that structural variations in high-level metrics can be revealed, analyzed, and acted upon.

Additional examples relate to using machine learning to model the relationship between the graph-theoretic attributes of segmented subgraphs (e.g., number of nodes/edges, average degree, subgraph diameter, etc.) and their contribution to high-level metrics of interest (e.g., DAU, MAU). This result is an indication of how interventions aiming to transform the structure of the graph might also transform both activity and metric for the better. These hypotheses can then be tested through targeted experiments (e.g., offering incentives to a group of influencers).

Certain examples relate to varying the graph definition criteria systematically to assess the sensitivity and stability of the resulting graph structures and their attributes. The thresholds, time windows, and relation types used to define graph edges are all significant. Thresholds that are too low will introduce noisy edges; thresholds that are too high will lose meaningful structure. Defining edges from activity over too short a period may miss potential relationships of interest and lead to dramatic changes in graph structure from one period to the next; defining edges from activity over too long a period may include relationships no longer of relevance and fail to reveal dramatic changes in activity within that period. When edges may represent different types of relationships (e.g., one-way versus bidirectional communication in email, or document collaboration based on co-authoring in different application formats), the choice of edge definition may similarly result in graphs with very different qualities that might suggest very different interventions. To give a combined example, the implicit graph based on any number of emails sent from one account to another over a year will be very different to the implicit graph based on ten or more bidirectional email exchanges within a week. A major consequence of using a graph formalism is that its flexibility allows for the dynamic generation of potential structured metrics. Users of the resulting metrics may attend to any subset of these according to their needs, using any substructures of any graphs to define meaningful, dynamic cohorts of actors or objects for comparison and monitoring over time.

These various aspects described herein may be integrated in a software service and deployed to the same infrastructure (e.g., the cloud) on which the activity data are logged and/or processed. This service may be offered as an enhanced "network metrics" capability to existing third-party users of cloud infrastructure as a way to extract additional business value from already-collected but not yet connected, instrumentation and telemetry data. The cloud infrastructure may enable activity logging at an unprecedented level of detail and scale, from monitoring of the processes and the media to the telemetric monitoring of product and service use. This data may be used to model activity in a connected way that suggests a new class of structured metrics and their use to drive new levels of value.

FIG. 1 shows a diagram of a system environment 100 for collecting data in accordance with one example. System environment 100 may include user devices 102, 104, and 106 connected via a network 120 to a set of servers (or other types of devices) configured to provide various applications and services. As an example, the servers (which may be housed in a data center) may include an application server 130, an email server 140, and a file server 150. In an abstract, but still definite, sense the servers may provide compute and storage functionality to the users of user devices 102, 104, and 106. The aspects described with respect to FIG. 1 can be implemented in cloud computing environments. In this description, "cloud computing" is described as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model may be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Still referring to FIG. 1, various telemetry agents may be configured to collect, process, and manage telemetry data. These telemetry agents may include monitoring agents, polling agents, notification agents, and collectors. The telemetry agents may interface with the various resources in system environment 100 via an application programming interface (API). As an example, various telemetry agents 122, 124, and 126 may be configured to monitor, poll, and notify telemetry data to collectors, which may then pass the data for storage in one or more databases. Telemetry agents 122, 124, and 126 may be configured to monitor, poll, and notify telemetry data to collectors corresponding to application server 130, email server 140, and file server 150. In a cloud computing environment, each of these services may be offered via a collection of compute, networking, and storage resources. Telemetry agents 122, 124, and 126 may interface with any of these resources via an appropriate API and collect telemetry data as part of the normal operation of the cloud computing systems.

With continued reference to FIG. 1, user devices 102, 104, and 106 may be any of a personal computing device, a laptop, a desktop, a smartphone, a tablet, or any other type of device that a user may use to access applications in a cloud computing environment. Each of user devices 102, 104, and 106 may run applications installed in the cloud computing environment, including applications related to word processing, presentations, graphics processing, database processing, email, messaging, collaboration and the like.

A logging service may also collect data from applications running in the cloud computing environment. The logging service (or services) may generate event files corresponding to application data and store them in a database. Streaming data may also be gathered using systems such as load balancers.

Figure 2:
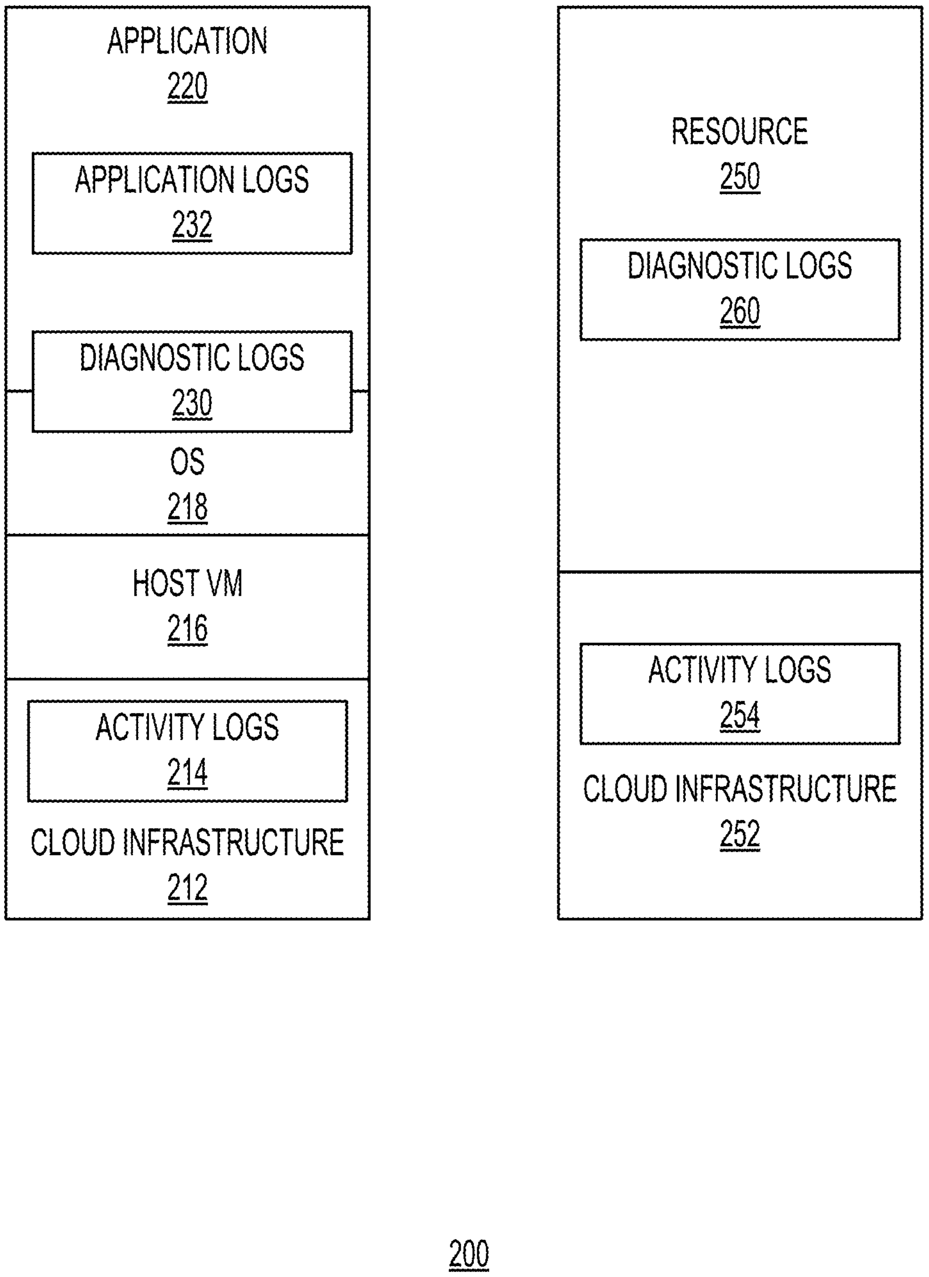
FIG. 2 shows a diagram of a cloud computing environment for collecting data in accordance with one example.

FIG. 2 shows a diagram of a cloud computing environment 200 for collecting data in accordance with one example. Cloud computing environment 200 shows data collection for both compute resources and non-compute resources. With respect to compute resources, cloud infrastructure 212 may include activity logs 214. Cloud computing environment 200 may include host virtual machines, e.g., host VM 216, which may execute an operating system (e.g. OS 218). Diagnostic logs 230 may collect diagnostics related data. Diagnostics data related to a deployed application on virtual machines in the cloud computing system may also be collected. This data may include event logs, performance counters, crash dumps, or other diagnostics related information gathered by the diagnostic service included as part of the cloud computing platform. Applications may be executed in the operating system environment and the data corresponds to such applications (e.g., Application 220) may be collected in application logs 232. With respect to non-compute resources, such as storage resources, cloud infrastructure 252 may include activity logs 254. The resources (e.g., resource 250) may also contribute data to diagnostic logs 260. Various monitoring agents, similar to the ones described earlier, may be used to collect the various types of data.

An active directory service (not shown) may also collect data for auditing purposes. As an example, the active directory service may collect data relating to application usage and sign-in activity. The application usage data may include application specific information. As an example, with respect to file storage, the data may include information concerning all activities related to file management. These activities may include opening a file, modifying a file, storing a file, deleting a file, moving a file, or copying a file.

Figure 3:
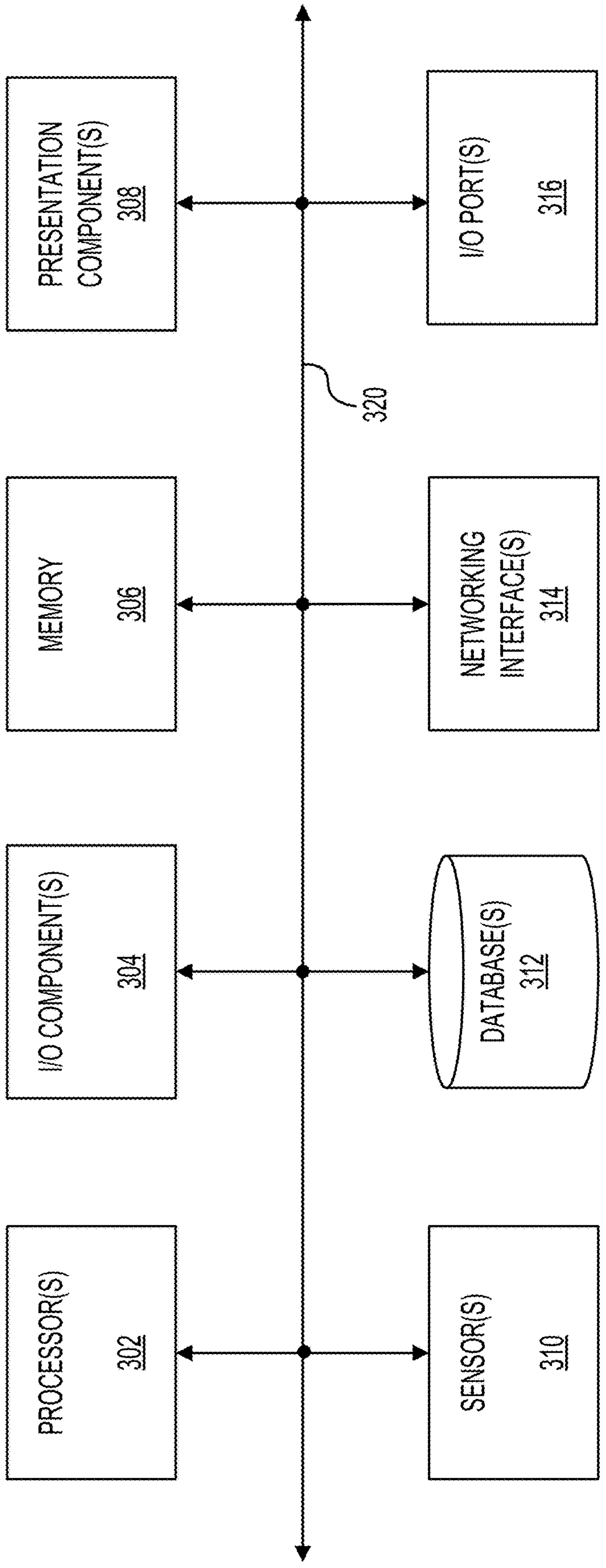
FIG. 3 is a block diagram of a system for performing methods associated with the present disclosure in accordance with one example.

FIG. 3 is a block diagram of a system 300 for performing methods associated with the present disclosure in accordance with one example. System 300 may include a processor(s) 302, I/O component(s) 304, memory 306, presentation component(s) 308, sensors 310, database(s) 312, networking interfaces 314, and I/O port(s), which may be interconnected via bus 320. Processor(s) 302 may execute instructions stored in memory 306. I/O component(s) 304 may include components such as a keyboard, a mouse, a voice recognition processor, or touch screens. Memory 306 may be any combination of non-volatile storage or volatile storage (e.g., flash memory, DRAM, SRAM, or other types of memories). Presentation component(s) may include displays, holographic devices, or other presentation devices. Displays may be any type of display, such as LCD, LED, or other types of display. Sensors 310 may include telemetry or other types of sensors configured to detect, and/or receive, information (e.g., collected data). Sensors 310 may include sensors described earlier or a subset of those sensors. Sensors 310 may be implemented in hardware, software, or a combination of hardware and software. Some sensors 310 may be implemented using a sensor API that may allow sensors 310 to receive information via the sensor API.

Still referring to FIG. 3, database 312 may be used to store any of the data collected or logged as part of the computing environment, as described with respect to FIGS. 1 and 2. Database 312 may be implemented as a collection of distributed databases or as a single database. Network interfaces 314 may include communication interfaces, such as Ethernet, cellular radio, Bluetooth radio, UWB radio, or other types of wireless or wired communication interfaces. I/O port(s) may include Ethernet ports, Fiber-optic ports, wireless ports, or other communication ports. Although FIG. 3 shows system 300 as including a certain number of components arranged and coupled in a certain way, it may include fewer or additional components arranged and coupled differently. In addition, the functionality associated with system 300 may be distributed, as needed.

Figure 4:
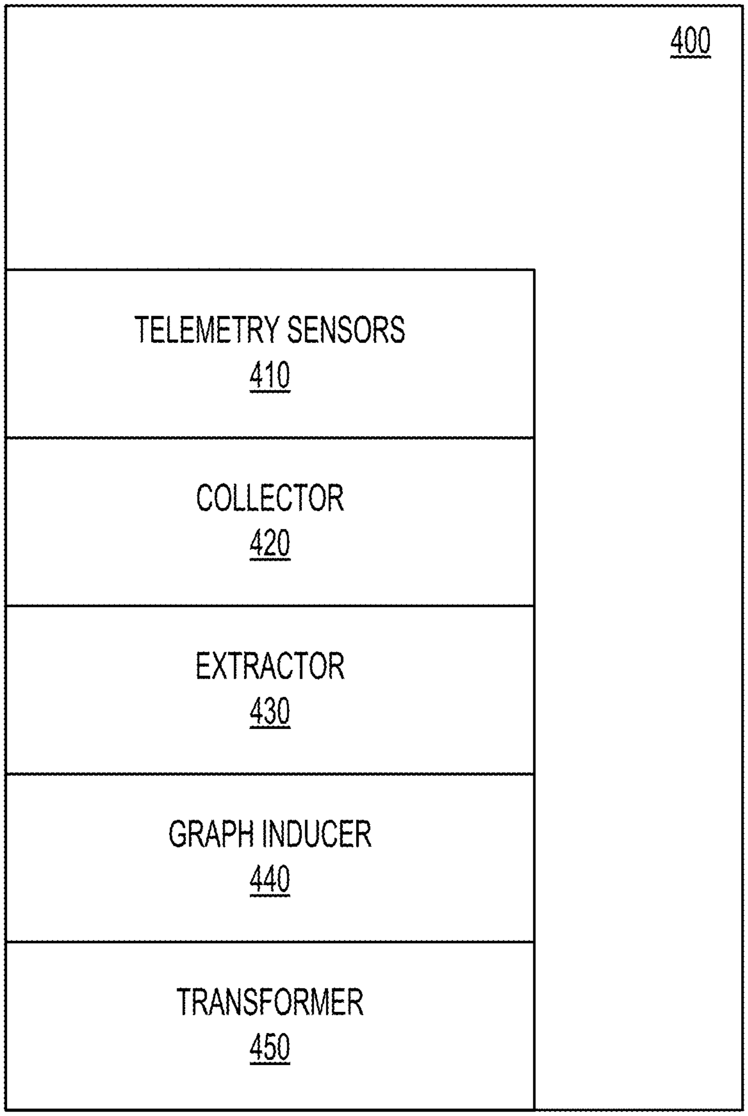
FIG. 4 shows a block diagram of a memory including modules with instructions for performing methods associated with the present disclosure in accordance with one example.

FIG. 4 shows a diagram of a memory 400 (e.g., memory 306 of FIG. 3) comprising modules with instructions for performing operations associated with system 300. Memory 400 may include telemetry sensors 410, collector 420, extractor 430, graph inducer 440, and transformer 450. Telemetry sensors 410 may include instructions, libraries, API, and other code for allowing receipt, formatting, and transmission of data, collected by the various telemetry agents and/or sensors described earlier, to collector 420. Collector 420 may include instructions, libraries, API, and other code configured to collect and manage all of this data, which may be referred to as already-collected but not yet connected data. Such data may include any of the data collected in activity logs 214, diagnostic logs 230, and application logs 232 associated with monitoring of applications and services in the cloud infrastructure. Such data may further include activity logs 254 and diagnostic logs 260 associated with resources being monitored in the cloud infrastructure. Without limitation, such data may include application event logs, clickstream data, social network interactions related data, e-commerce transactions related data, search engine related data, or any other data that may be collected during normal operations of the cloud infrastructure, services, and applications.

With continued reference to FIG. 4, extractor 430 may include instructions, libraries, API, and other code configured to use data extraction techniques to extract only data that relates to the data needed from the graph data embedding process. As an example, extractor 430 may extract only that data which relates to a specific actor or actors, or actor type(s), or to a specific object or objects, or object type(s) with respect to a target activity. Graph inducer 440 may represent the actions of actors as edges in a graph that connect nodes (representing the actors performing those actions and the objects being acted upon). In certain examples, such edges are necessarily directed because the actor is performing the action on the object and not vice-versa. The resulting graph may also be heterogeneous in structure, representing relations between two distinct types of nodes (actors and objects).

Still referring to FIG. 4, transformer 450 may include instructions, libraries, API, and other code configured to use graph embedding method(s) to convert the discrete, high-dimensional graph representation into a continuous, low-dimensional metric space. Transformer 450 may use any of a range of graph embedding techniques that can transform the edges of a graph into a metric space in which nodes with similar connections are embedded at similar locations. This form of dimensionality reduction has the advantage that discrete edge relations are replaced by a continuous notion of relatedness based on distance (e.g., Euclidean) or similarity (e.g., Cosine), allowing the relatedness of any pair of nodes to be measured directly even if they lack a connecting edge in the original graph structure. Such a transformation may simplify and generalize the inference of the node communities and the nearest neighbours.

Using systems and methods described in the present disclosure a user may analyze the data collected earlier to extract information concerning the actor, the action, the object, and the time representing a unit-level contribution to the overall activity. From these individual activity contributions, one may induce a graph in which edges are created in one of two typical ways depending on the node type of interest: (1) between actor nodes whenever both actors perform the same action of interest on the same object in the same time window, with the edge weight reflecting the aggregate (e.g., count) of shared actions across all objects, and (2) between object nodes whenever both objects receive the same action of interest from the same actor in the same time window, with the edge weight reflecting the aggregate (e.g., count) of shared actions across all actors.

From the same data, multiple graphs can be induced based on different nodes, actions, and time windows of interest. Example time windows of interest include: (1) all time (i.e., since data collection began), suitable for when historic activity always remains equally relevant, (2) the last period of a given duration calculated in a rolling fashion (e.g., the last year), suitable for when recent activity is most relevant, and (3) all periods defined by a sliding and potentially overlapping time window (e.g., a 4-week time window sliding in 2 week increments to create a 2-week overlap between adjacent time windows); suitable when change in activity is relevant.

Figure 5:
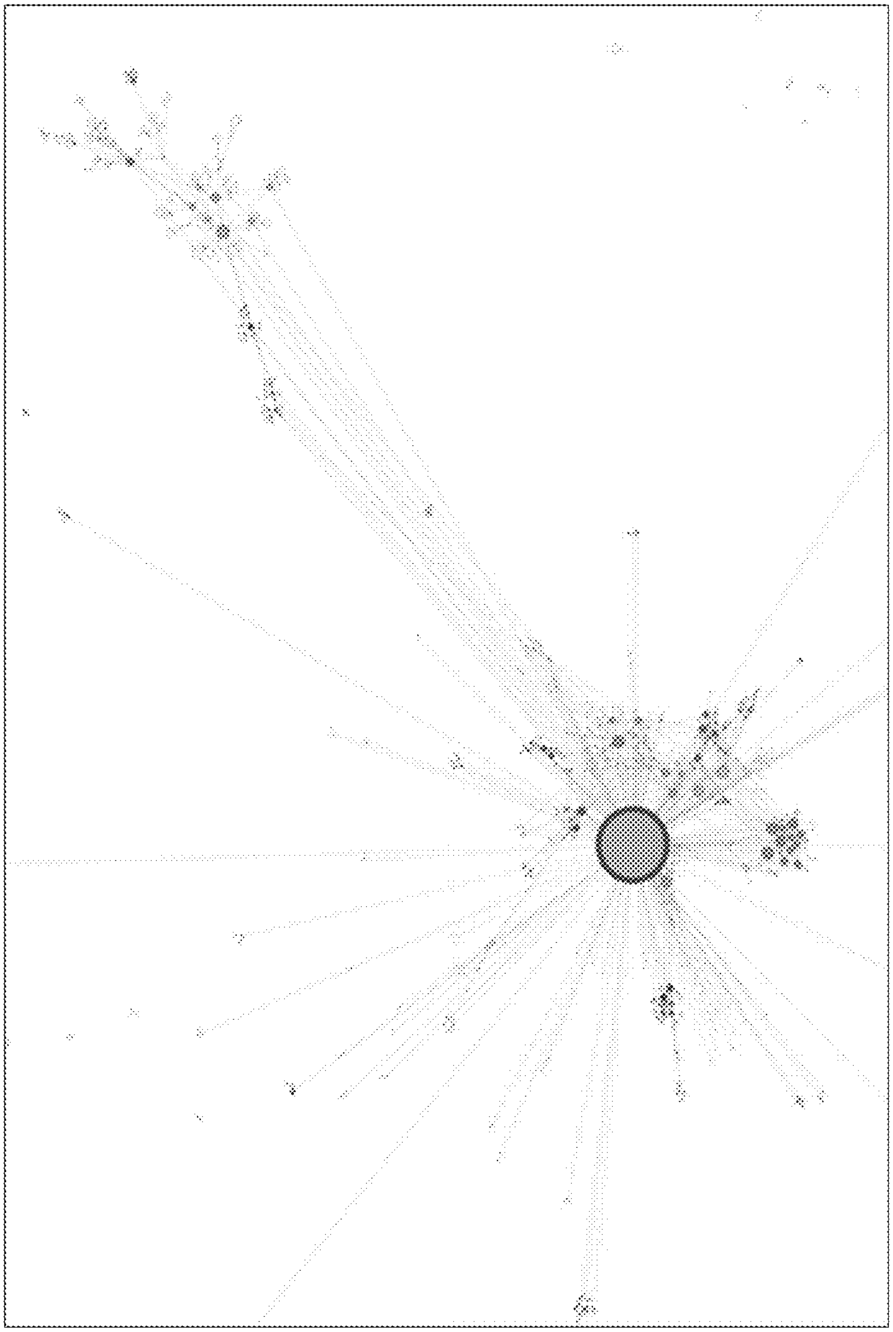
FIG. 5 shows a node-link graph in accordance with one example.
Figure 6:
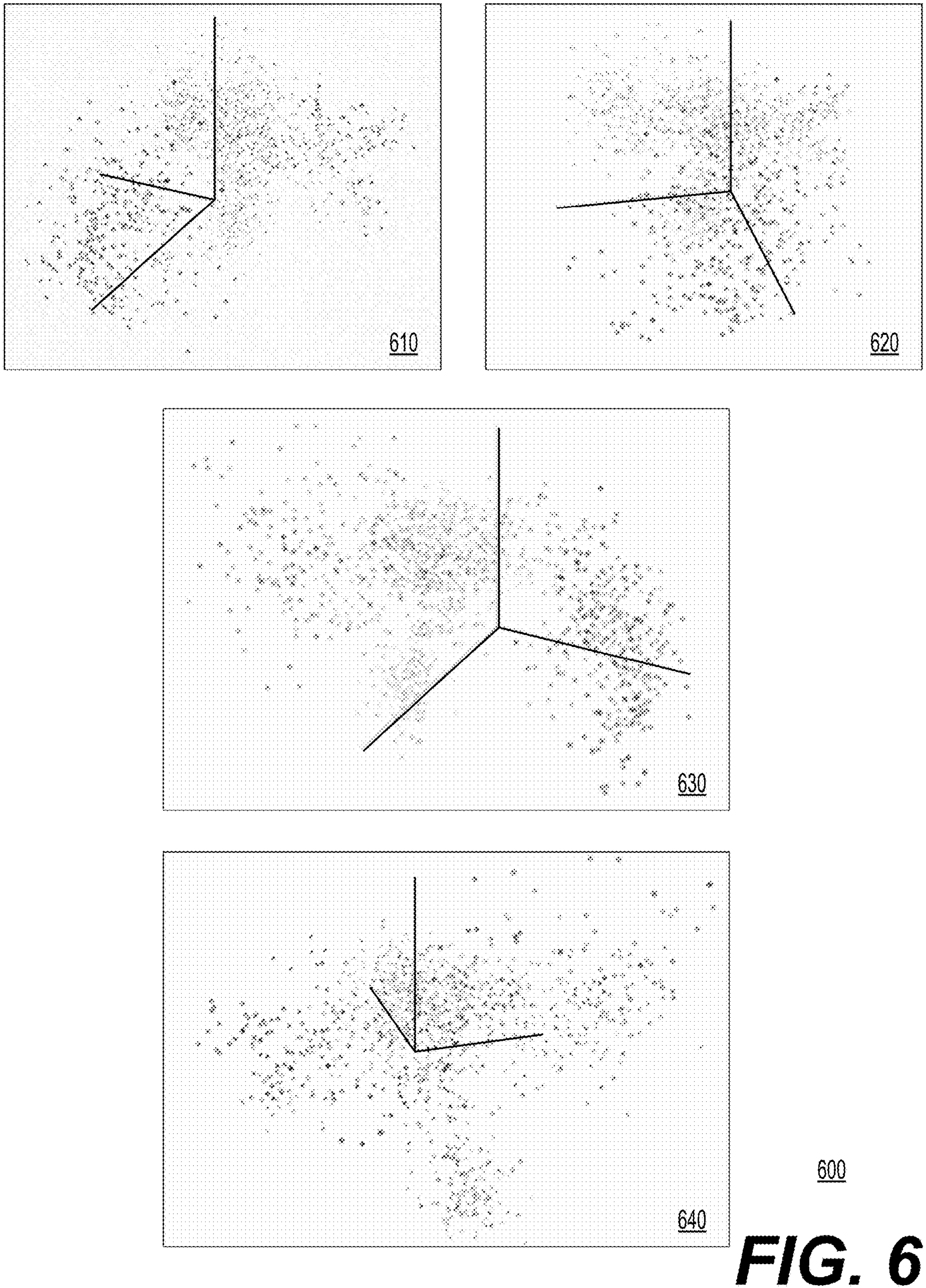
FIG. 6 shows four different views of a graph that reveals the communities of users with strong collaboration in accordance with one example.

To see the connected nature of such collaborative activity, one can create an undirected weighted graph in which nodes are individual users, edges represent evidence of collaboration within a defined time period, and edge weights correspond to the frequency of collaboration. As an example, FIG. 5 shows a node-link graph 500 in which links represent relationships. Performing community detection (e.g., using Louvain modularity optimization) over such a graph will reveal "communities" of users with strong collaboration among their members and relatively weaker collaboration with users in other communities. FIG. 6 shows four different views (view 610, view 620, view 630, and view 640) of a graph that reveals the communities of users with strong collaboration. Such dynamic, activity-based segmentation of users into distinct communities over longer timeframes (e.g., based on historic data or a sliding window of several months) allows finer-grained metrics (e.g., daily average users (DAU), weekly active users (WAU), and monthly active users (MAU)) to be broken down and reported on a community-by-community basis, in ways that reveal structural variation in use. Graph-theoretic attributes of these communities (e.g., number of users, number of collaboration links, average frequency per link, average collaborators per user, ratio of internal to external links, average clustering coefficient per user, etc.) can be used as features for machine learning that attempts to model the relationship between the structure of a community and the engagement that results. The same approach can also be applied to the complete user graph, with graph-theoretic attributes like the number and modularity of communities used as additional features in the modeling of overall engagement metrics. Both nodes and edges may be cut from each resulting graph to reduce noise and emphasize recurrent, meaningful structure. For example, edges may be cut if their weight is below a threshold, or edges may be cut in increasing weight order (or other statistics such as betweenness centrality or mutual information) until the reduced graph exhibits desirable statistical properties (such as a target modularity score representing a clear partitioning of the graph into communities of closely related nodes).

In certain examples consistent with the present disclosure, one may use a graph embedding method to convert the discrete, high-dimensional graph representation into a continuous, low-dimensional metric space. One example graph embedding method is node2vec, which uses random walks over the graph to convert nodes into vector representations suitable for word embedding using neural network models such as word2vec. In this example, the input weights to each neuron in the hidden layer may define a dimension of the embedding space.

Figure 7:
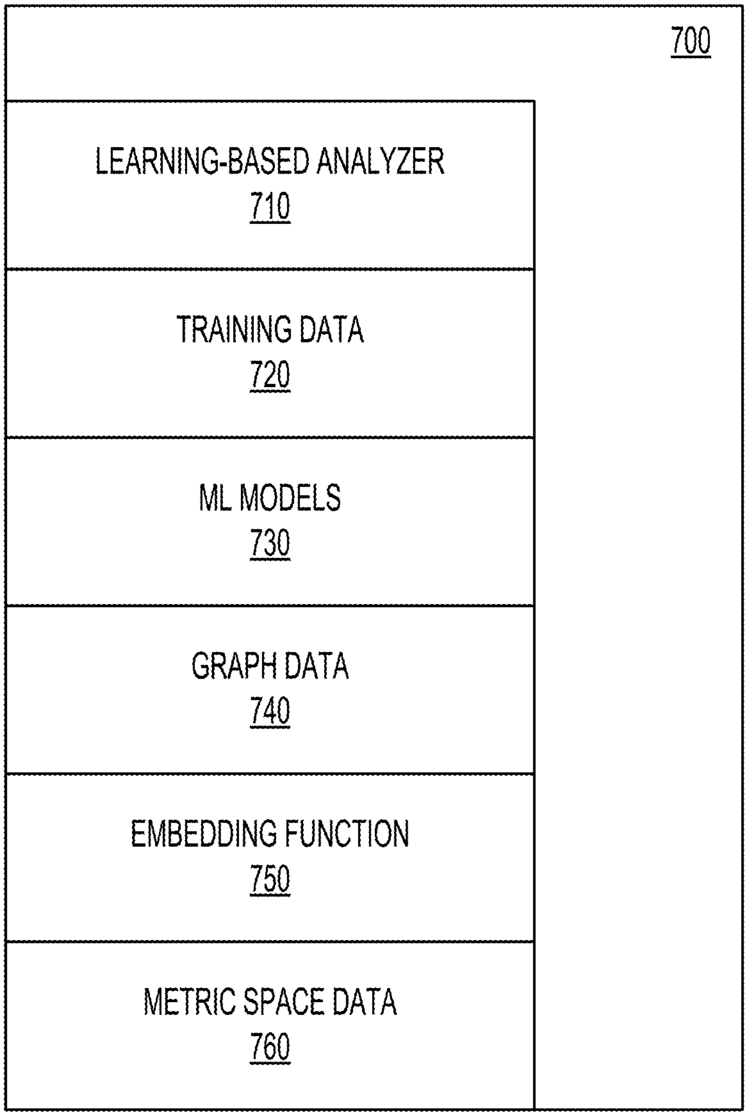
FIG. 7 shows a block diagram of a memory including modules with instructions and data for graph embedding related methods in accordance with one example.

FIG. 7 shows a memory 700 including modules of instructions and data for graph embedding related methods in accordance with one example. The instructions may be executed by processor 310 of FIG. 3 and memory 700 may correspond to memory 306 of FIG. 3. Some other processors and/or memories may also be used to store and execute the instructions. Memory 700 may include a learning-based analyzer (LBA) 710, training data 720, machine learning (ML) models 730, graph data 740, embedding function 750, and metric-space data 760. Although FIG. 7 shows instructions and data organized in a certain way, the instructions and data may be combined or distributed in various ways. As an example, the data may be input via databases coupled to high-speed memories and may also be output via high-speed memories before being stored in databases.

With continued reference to FIG. 7, learning-based analyzer (LBA) 710 may implement a supervised learning algorithm that can be trained based on input data and once it is trained it can make predictions or prescriptions based on the training. In this example, LBA 710 may implement techniques such as Linear Regression, Support Vector Machine (SVM) set up for regression, Random Forest set up for regression, or Gradient-boosting trees set up for regression and neural networks. Linear regression may include modeling the past relationship between independent variables and dependent output variables. Neural networks may include artificial neurons used to create an input layer, one or more hidden layers, and an output layer. Each layer may be encoded as matrices or vectors of weights expressed in the form of coefficients or constants that might have been obtained via off-line training of the neural network. Neural networks may be implemented as Recurrent Neural Networks (RNNs), Long Short Term Memory (LSTM) neural networks, or Gated Recurrent Unit (GRUs). All of the information required by a supervised learning-based model may be translated into vector representations corresponding to any of these techniques. Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In the case of using the LSTM, a single chunk of content may be encoded into a single vector or multiple vectors. As an example, a node may be encoded as a single vector. Each chunk may be encoded into an individual layer (e.g., a particular time step) of an LSTM network. An LSTM layer may be described using a set of equations, such as the ones below:

$$i_t=\sigma(W_{xi}xt+W_{hi}h_{t-1}+W_{ci}c_{t-1}+b_i$$

$$f_t=\sigma(W_{xf}x_t+W_{hf}h_{t-1}+W_{cf}c_{t-1}+b_f)$$

$$c_t=f_tc_{t-1}i_t \tanh(W_{xc}x_t+W_{hc}h_{t-1}+b_c)$$

$$o_t=\sigma(W_{xo}x_t+W_{ho}h_{t-1}+W_{co}c_t+b_o)$$

$$h_t=o_t \tanh(c_t)$$

In this example, inside each LSTM layer, the inputs and hidden states may be processed using a combination of vector operations (e.g., dot-product, inner product, or vector addition) or non-linear operations, if needed.

Although FIG. 7 describes LBA 710 as comprising instructions, the instructions could be encoded as hardware corresponding to an A/I processor. In this case, some or all of the functionality associated with the learning-based analyzer may be hard-coded or otherwise provided as part of an A/I processor. As an example, A/I processor may be implemented using an FPGA with the requisite functionality.

Training data 720 may be data that may be used to train a neural network model or a similar machine learning model. In one example, training data 720 may be used to train the machine learning model to minimize an error function (or an objective function) associated with the conversion of the graph data to two-dimensional metrics data. ML models 730 may include machine learning models that may prescribe strategies associated with the training and prediction. As an example, one example ML model may prescribe how many nodes should be traversed as part of random walks or some other algorithm. ML models 730 may further include models that allow LBA 710 to model a relationship between graph attributes associated with graph data and at least one higher-level metric associated with a target activity. Graph attributes may include a size of the graph, a radius of the graph, a diameter of the graph, a centrality related measure associated with each of nodes of the graph, a connectivity measure associated with the at least one graph, and a dynamic measure associated with the graph. The higher-level metrics may include any metrics that provide insights related to target activity. As an example, the higher-level metrics may include scale metrics, stickiness metrics, and attrition metrics. Without limitation, scale metrics may include daily active users (DAU), weekly active users (WAU), or monthly active users (MAU). Stickiness metrics may include ratios of scale metrics to show how often users return to the service; for example, a DAU/MAU ratio of 0.25 can be interpreted as users engaging with the service on one day out of four on average. Attrition metrics may include user retention percentages over various time periods (e.g., Day 1, Day 2, Week 1). In one example, higher-level metrics may refer to any metrics that specifically relate to a target activity and are not simply first order measurements associated with a graph.

In one example, the learning problem may be viewed as a maximum likelihood optimization problem. Graph data 740 for a network may be represented in terms of G=(V, E), where V corresponds to the set of vertices and E corresponds to the set of edges for the graph G. Assuming the mapping function (e.g., embedding function 750) corresponds to mapping nodes to vectors (e.g., metric space data 760 expressed in the form of two dimensions), the learning task may be to determine vectors (e.g., two dimensional vectors) that capture for every source node a network neighborhood of the node using a sampling strategy, which may be provided by the ML model. The embedding function (e.g., embedding function 750) may be an objective function that optimizes the probability of observing network neighborhoods for a node. As used in the node2vec algorithm, the sampling strategy may be a biased random walk procedure that could explore neighborhoods in both breadth-first sampling (BFS) and depth-first sampling (DFS) fashion. For any graph, such as the one shown in FIG. 5, the node2vec algorithm may be used by implementing three steps: 1) transition probabilities may be precomputed, 2) random walk simulations may be performed, and 3) optimization may be performed using stochastic gradient descent (SGD). Once LBA 710 is trained, it could be used to represent each node in a metric space by using node2vec algorithm. While FIG. 7 shows one approach, other approaches may also be used. As an example, another class of approaches, known as spectral graph embeddings, may perform dimensionality reduction using eigen-decomposition of the graph Laplacian or adjacency matrix. The resulting approaches are known as Laplacian Spectral Embedding (LSE) and Adjacency Spectral Embedding (ASE) respectively. In one example, LSE may be used to convert graph data into metric space data using adjacency matrix (the elements of the matrix indicate whether the pairs of vertices are adjacent or not in the graph) and the degree centrality. In one example, the k eigenvectors corresponding to the k lowest non-zero eigenvalues may define a k-dimensional embedding space. For dynamic graphs defined by different graph structures for each of multiple time windows, the Omnibus Embedding (Omni) extension of the ASE allows the change in connectivity for each node to be quantified.

A range of analytical questions about the activity (e.g., the activity of the users etc.) can be answered because of the metric spaces created by these graph embeddings (e.g., the fact that the distances between any pair of points can be interpreted as "relatedness"). As an example, the nodes that are related to the node of interest may be determined by returning the nearest neighbors to the node of interest in the embedding space, in a process known as vertex nomination. As another example, the stability of the connections of a node, community, group, or graph over time may be determined by measuring the aggregate distance between nodes representing the same underlying actor/object of interest in successive time windows, then aggregating across all actors/objects of interest, in a process, which may be referred to as dynamics modeling.

Figure 8:
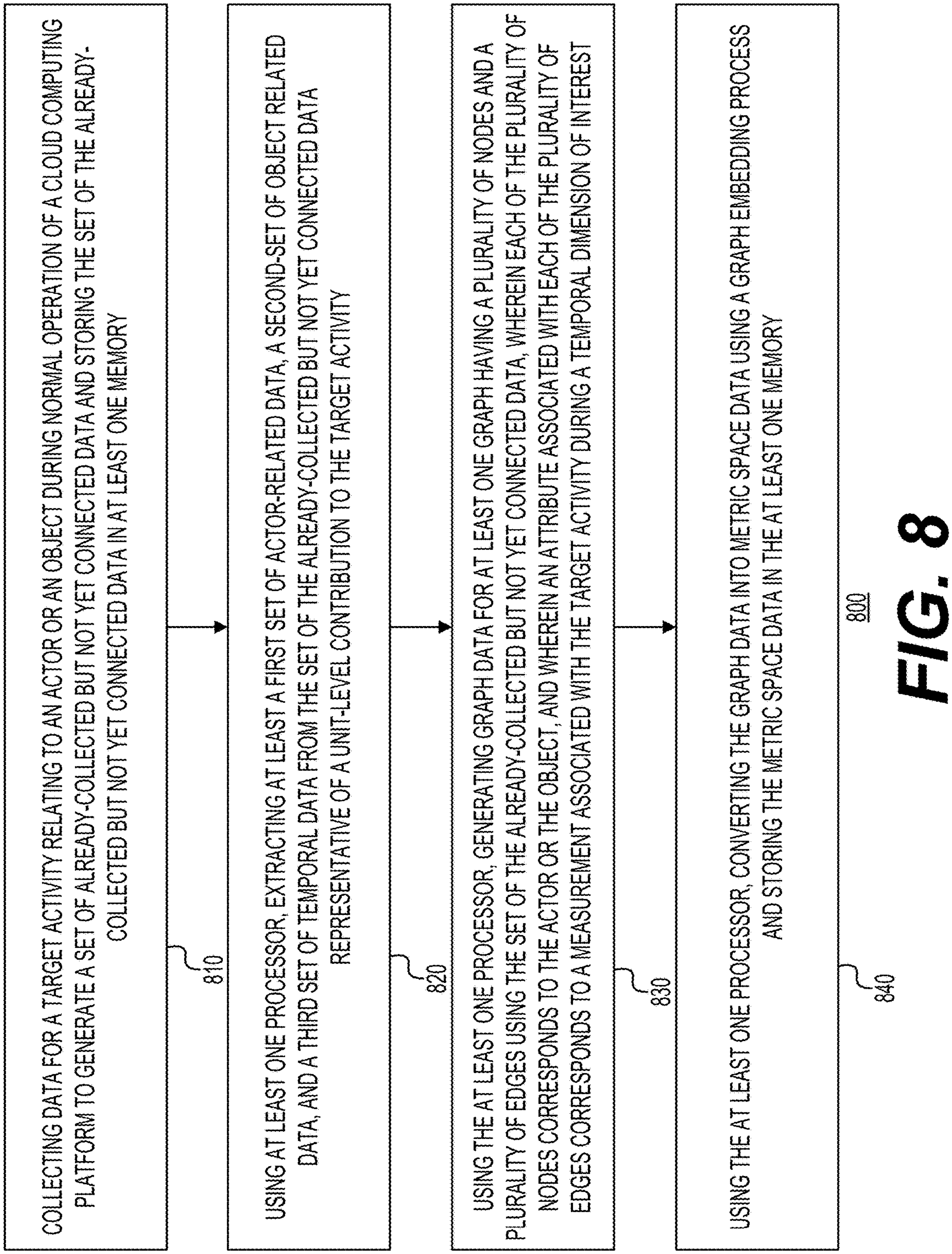
FIG. 8 shows a flowchart corresponding to a method including graph embedding in accordance with one example.

FIG. 8 shows a flowchart 800 corresponding to a method including graph embedding in accordance with one example. Step 810 may include collecting data for a target activity relating to an actor or an object during normal operation of a cloud computing platform to generate a set of already-collected but not yet connected data and storing the set of the already-collected but not yet connected data in the at least one memory. In one example, this step may be performed by collector 420, when instructions corresponding to collector 420 are executed by a processor (e.g., processor 302). In this example, already-collected but not yet connected data may include any of the data collected in activity logs 214, diagnostic logs 230, and application logs 232 associated with monitoring of applications and services in the cloud infrastructure. Such data may further include activity logs 254 and diagnostic logs 260 associated with resources being monitored in the cloud infrastructure. Without limitation, such data may include application event logs, clickstream data, social network interactions related data, e-commerce transactions related data, search engine related data, or any other data that may be collected during normal operations of the cloud infrastructure, services, and applications. Applications or services may output such data by writing the data to files, e.g., batch files (e.g., CSV files) stored in a storage associated with the cloud infrastructure. Applications or services may output such data by providing the data to databases associated with the cloud infrastructure. Applications or services may also stream data to a streaming or messaging service, which in turn may transfer the data to a storage associated with the cloud infrastructure. Streaming data may include telemetry data gathered by sensors that may collect data when certain events are triggered. Any of the sensors used for cloud telemetry may generate data that could be stored and made accessible as part of the already-collected but not yet connected data. Streaming data may further include data generated by the Internet of Things (IoT) devices connected or serviced by the cloud infrastructure.

Step 820 may include using at least one processor, extracting at least one of a first set of actor-related data, a second-set of object related data, and a third set of temporal data from the set of the already-collected but not yet connected data representative of a unit-level contribution to the target activity. In one example, this step may be performed by extractor 430, when instructions corresponding to extractor 430 are executed by a processor (e.g., processor 302). Extractor 430 may use data extraction techniques to extract only data that relates to the data needed from the graph data embedding process. As an example, extractor 430 may extract only that data which relates to a specific actor or actors, or actor type(s), or to a specific object or objects, or object type(s) with respect to a target activity. Target activities may include activities related to a user's use of applications, services, or other aspects related to the cloud computing platform. Additional examples of target activities and the extracted data are provided with respect to certain applications of the graph embedding process in the context of certain use case scenarios. Such extracted data may also be constrained based on time constraints, as described earlier.

Step 830 may include using the at least one processor, generating graph data for at least one graph having a plurality of nodes and a plurality of edges using the set of the already-collected but not yet connected data, where each of the plurality of nodes corresponds to the actor or the object, and where an attribute associated with each of the plurality of edges corresponds to a measurement associated with the target activity during a temporal dimension of interest. In one example, this step may be performed by graph inducer 440, when instructions corresponding to graph inducer 440 are executed by a processor (e.g., processor 302). Graph inducer 440 may represent the actions of actors as edges in a graph that connect nodes (representing the actors performing those actions and the objects being acted upon). In certain examples, such edges are necessarily directed because the actor is performing the action on the object and not vice-versa. The resulting graph may also be heterogeneous in structure, representing relations between two distinct types of nodes (actors and objects). For many forms of analysis, however, it may be beneficial to operate on an undirected graph structure showing relations between nodes of only a single target type (e.g., actors or objects, but not both). Graph inducer 440 may create a new graph containing all nodes of the target type from a source graph, with edges connecting all pairs of target nodes that share a connection to a non-target node and edge weights representing the frequency (or other aggregation) of such connections. This approach may be used to project activity logs, which may be the extracted data, into actor-graphs or object-graphs that encode the frequency of pairwise actions between nodes of a single type. Depending on the node type of interest, graph inducer 440 may create in two ways. In one example, the graph may be between actor nodes whenever both actors perform the same action of interest on the same object in the same time window, with the edge weight reflecting the aggregate (e.g., count) of shared actions across all objects. In another example, the graph may be between object nodes whenever both objects receive the same action of interest from the same actor in the same time window, with the edge weight reflecting the aggregate (e.g., count) of shared actions across all actors.

In terms of the temporal dimension, from the same already-collected but not yet connected data, multiple graphs can be induced based on different nodes, actions, and time windows of interest. Example time windows of interest include: (1) all time (i.e., since data collection began), which may be suitable for when historic activity always remains equally relevant; (2) the last period of a given duration calculated in a rolling fashion (e.g., the last year), which may be suitable for when recent activity is most relevant; and (3) all periods defined by a sliding and potentially overlapping time window (e.g., a 4-week time window sliding in 2 week increments to create a 2-week overlap between adjacent time windows), which may be suitable when change in the target activity is relevant.

With continued reference to FIG. 8, both nodes and edges may be cut from each resulting graph to reduce noise and emphasize recurrent, meaningful structure. For example, edges may be cut if their weight is below a threshold, or edges may be cut in increasing weight order (or other statistic such as betweenness centrality or mutual information) until the reduced graph exhibits desirable statistical properties (such as a target modularity score representing a clear partitioning of the graph into communities of closely related nodes).

Step 840 may include using the at least one processor, converting the graph data into metric space data using a graph embedding process and storing the metric space data in the at least one memory. In one example, this step may be performed by transformer 450, when instructions corresponding to transformer 450 are executed by a processor (e.g., processor 302). Transformer 450 may use a graph embedding method to convert the discrete, high-dimensional graph representation into a continuous, low-dimensional metric space. Transformer 450 may use any of a range of graph embedding techniques that can transform the edges of a graph into a metric space in which nodes with similar connections are embedded at similar locations. This form of dimensionality reduction has the advantage that discrete edge relations are replaced by a continuous notion of relatedness based on distance (e.g., Euclidean) or similarity (e.g., Cosine), allowing the relatedness of any pair of nodes to be measured directly even if they lack a connecting edge in the original graph structure. Such a transformation may simplify and generalize the inference of the node communities and the nearest neighbours.

In one example, transformer 450 may use the node2vec graph embedding process. The node2vec graph embedding process may require the specification of several parameters, including: (1) window size, (2) in/out (P,Q) hyperparameters, (3) epochs, (4) walk length/number of walks per length, and (5) dimensions to embed to. Window size may specify how far does one look around a term within walk when performing a skipgram. Epochs may specify how many iterations to run through as part of the node2vec process to stabilize the resulting embedding. Walk length/number of walks per node may have a significant impact on how sampling is performed. Dimensions to embed to specify the number of dimensions used to represent a tensor as part of the embedded space. The number of dimensions may be selected to high enough to describe the separation between vertices adequately. As an example, the number of dimensions may be 128. For a given task at hand, transformer 450 may be configured to tune these parameters accordingly. As an example, if the locality of the graph embedding is the attribute that one wants to focus on then a smaller window size may be used. Epochs can be particularly useful to achieve a stability in the resulting embedding. Walk length is used to determine how much of the graph and which portions are sampled. Typically, the walk length needs to be kept sufficiently large to make sure one can see the coverage beyond just the local neighborhood. In addition, the walk length must be larger than the selected value for the window size parameter.

As part of the node2vec process, transformer 450 may represent each node of a graph by the neighborhood of other nodes that one is likely to reach by taking fixed-length random walks from that node. The transition probability for the next step in each random walk may be the product of the proportional weight of the outbound edge under consideration (from the total weight of all incident edges) and a parameter that may bias the search towards a given balance of breadth-first and depth-first traversal. The final representation of each node's neighborhood may be aggregated from multiple random walks beginning at that node. In one example, transformer 450 may use these neighborhoods to train a neural network to predict nearby nodes. In this example, the prediction may be performed using skipgram sampling, in which a single hidden-layer feedforward neural network is trained to predict neighborhoods from nodes through a process of stochastic gradient descent (SGD). Since nearby nodes in the graph will have similar neighborhoods, the neural network will encode those nodes with similar weights. Transformer 450 may map these weights into positions on spatial dimensions. The nodes that are nearby in the graph in terms of link following will also be nearby in the embedding space.

As part of step 840, other approaches may also be used. As an example, another class of approaches, known as spectral graph embeddings, may perform dimensionality reduction using eigen-decomposition of the graph Laplacian or adjacency matrix. The resulting approaches are known as Laplacian Spectral Embedding (LSE) and Adjacency Spectral Embedding (ASE) respectively. In these approaches, the k eigenvectors corresponding to the k lowest non-zero eigenvalues define a k-dimensional embedding space. For dynamic graphs defined by different graph structures for each of multiple time windows, the Omnibus Embedding (Omni) extension of the ASE allows the change in connectivity for each node to be quantified. Although FIG. 8 shows certain number of steps being performed in a certain order, additional or fewer steps may be performed in the same order or a different order.

Figure 9:
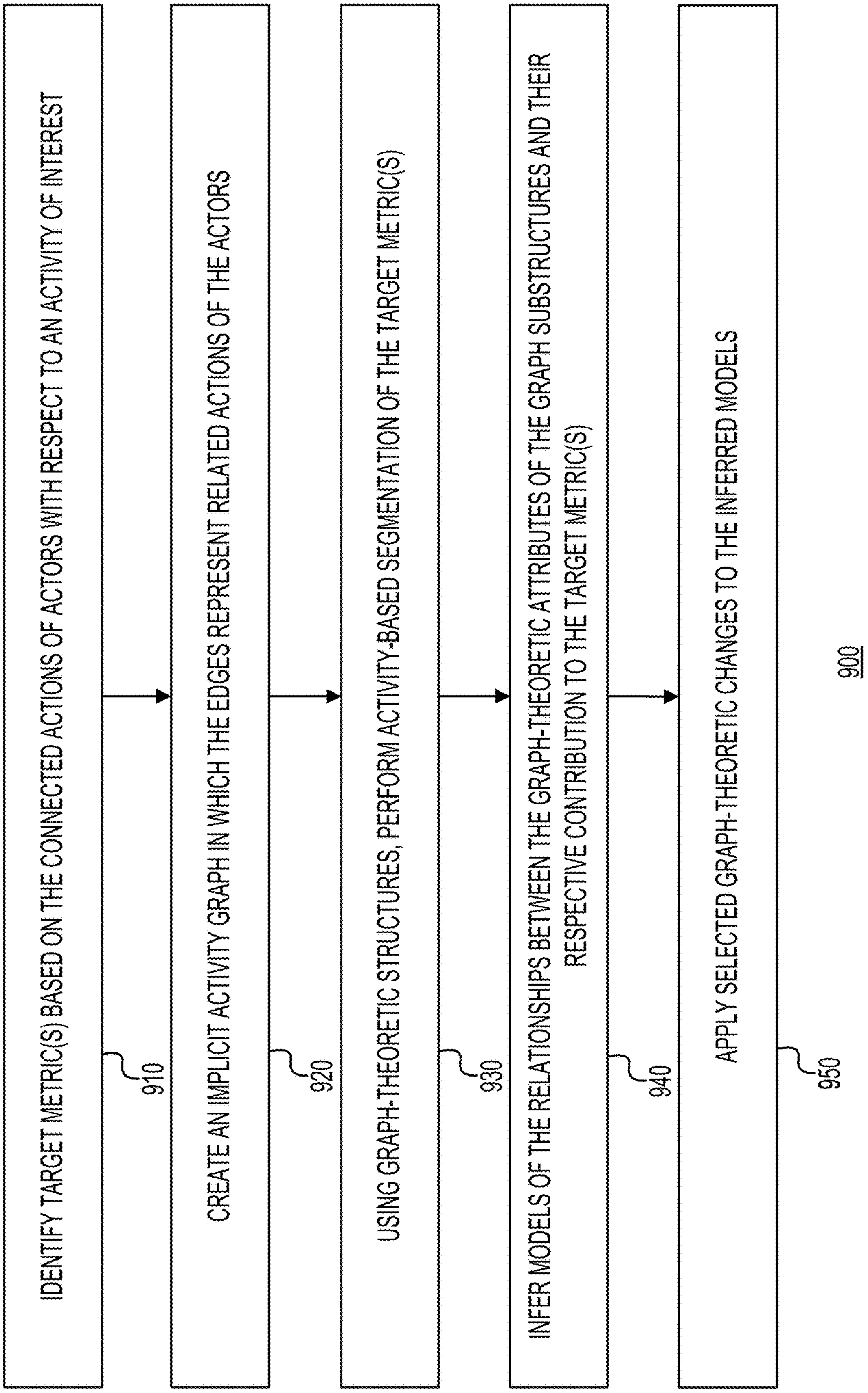
FIG. 9 shows a process flow in accordance with an example.

FIG. 9 shows a process flow 900 in accordance with an example. Step 910 may include identifying target metric(s) based on the connected actions of interdependent actors with respect to an activity of interest. In this example, this step may include obtaining target metric(s) based on a use case scenario. Table 1 provides examples of activities of interest, which may be categorized into activities that relate to interaction, production, consumption, or exchange. Document editing is an example activity related to the interaction activity. The target metrics for this activity may be daily average users (DAU), weekly average users (WAU), or monthly active users (MAU).

TABLE 1

| Activity | Example | Metric average | Implicit edge definition | Graph metric drilldown | Inference technique |
|---|---|---|---|---|---|
| Interaction | Document editing | DAU, WAU, MAU | Same object | By community | Vertex nomination |
| Production | Case investiga-tion | Cases per period | Similar objects | By connected component | Graph matching |
| Con-sumption | Content browsing | Click-through rate | Successive objects | By walk/path | Link prediction |
| Exchange | API service utilization | Calls/ dollars per period | Synchronous actions | By clique | Dynamics forecasting |

Step 920 may include creating an implicit activity graph in which the edges represent related actions of actors. Graph inducer 440 of FIG. 4 may be used to perform this step. The implicit edges definition may be the same objects for the document editing example. As shown in Table 1, implicit edges may also be defined based on similar objects, successive objects, or synchronous actions. As part of this step, machine learning may be used to infer links. As an example, LBA 710 may access at least one machine learning model (e.g., one of ML Models 730) to infer target metrics. As an example, in creating an activity graph relating to the technical support fraud, the phone numbers from where such fraudulent calls are placed may be the nodes that link to the numbers that are being dialed from each of these phone numbers. A machine learning model including fuzzy matching of area codes or other phone identifiers may be used to infer additional links among the various nodes in the activity graph. In another example, online advertisements related to such scams may be analyzed. Thus, the online advertisements on web pages may be processed (e.g., using optical character recognition) to extract phone numbers from the images of the offending web pages and connect phone numbers to the web pages based on the visual similarity of the web pages. A machine learning model may be used to classify and identify images based on visual similarity.

Step 930 may include using graph-theoretic structures to support activity-based segmentation of the target metric(s). This step may be performed by transformer 450 of FIG. 4. As an example, transformer 450 may determine which nodes are related to a node of interest by returning the nearest neighbors to the node of interest in the embedding space using vertex nomination. Transformer 450 may also help determine meaningful groups of related nodes by performing spatial clustering (e.g., DBSCAN) of the nodes in the embedding space. Transformer 450 may also help determine the stability of the connections of the node, including the stability of a community over time. In this example, using a process referred to as dynamics modeling the stability may be determined by measuring the aggregate distance between nodes representing the same underlying actor/object of interest in successive time windows, then aggregating across all actors/objects of interest.

Step 940 may include inferring models of the relationships between the graph-theoretic attributes of the graph substructures and their respective contribution to the target metric(s). A metric may be interpreted according to the detected communities of the activity graph, revealing the structural distribution of the metric and supporting the diagnosis of problem communities that would benefit from intervention. As an example, a metric may be improved by using vertex nomination to support the target activity. For example, if the already-collected but not yet connected data shows that an actor performs an action that expresses an interest in an object/actor, then the system could help the user by using vertex nomination to recommend related objects/actors that might also be of interest (like query suggestions in a search engine or people suggestions in a social network). A metric may be predicted at the graph and community levels using regression analysis over graph features including basic graph measures (e.g., size, radius, diameter), centrality measures (e.g., degree centrality, betweenness centrality, closeness centrality, eigenvector centrality, percolation centrality), connectivity measures (e.g., clustering coefficient, density), and dynamics measures (e.g., Omni stability, scan statistic). Appropriate supervised machine learning techniques for regression analysis include Artificial Neural Networks, Support Vector Machines, k-Nearest Neighbors (k-NN), and linear regression. Predictions may be used to explore the possible effects of activity interventions that transform the activity graph in specific ways (e.g., increasing community sizes or density). LBA 710 of FIG. 7 may be used to perform at least some of these predictions. A metric driven by viral diffusion through the activity graph may be modeled and predicted using feature diffusion over the graph embedding. Possible interventions may include using predictions to target nodes in ways that accelerates or slows the diffusion process through the activity graph.

Step 950 may include applying selected graph-theoretic changes to the inferred models. In this example, the selected graph-theoretic changes may be applied in order to maximize the expected improvements to the target metric(s). Although FIG. 9 shows certain steps, additional or fewer steps may be performed.

Figure 10:
FIG. 10 shows a search engine example having a user interface, including a search window, in accordance with one example.
Figure 11:
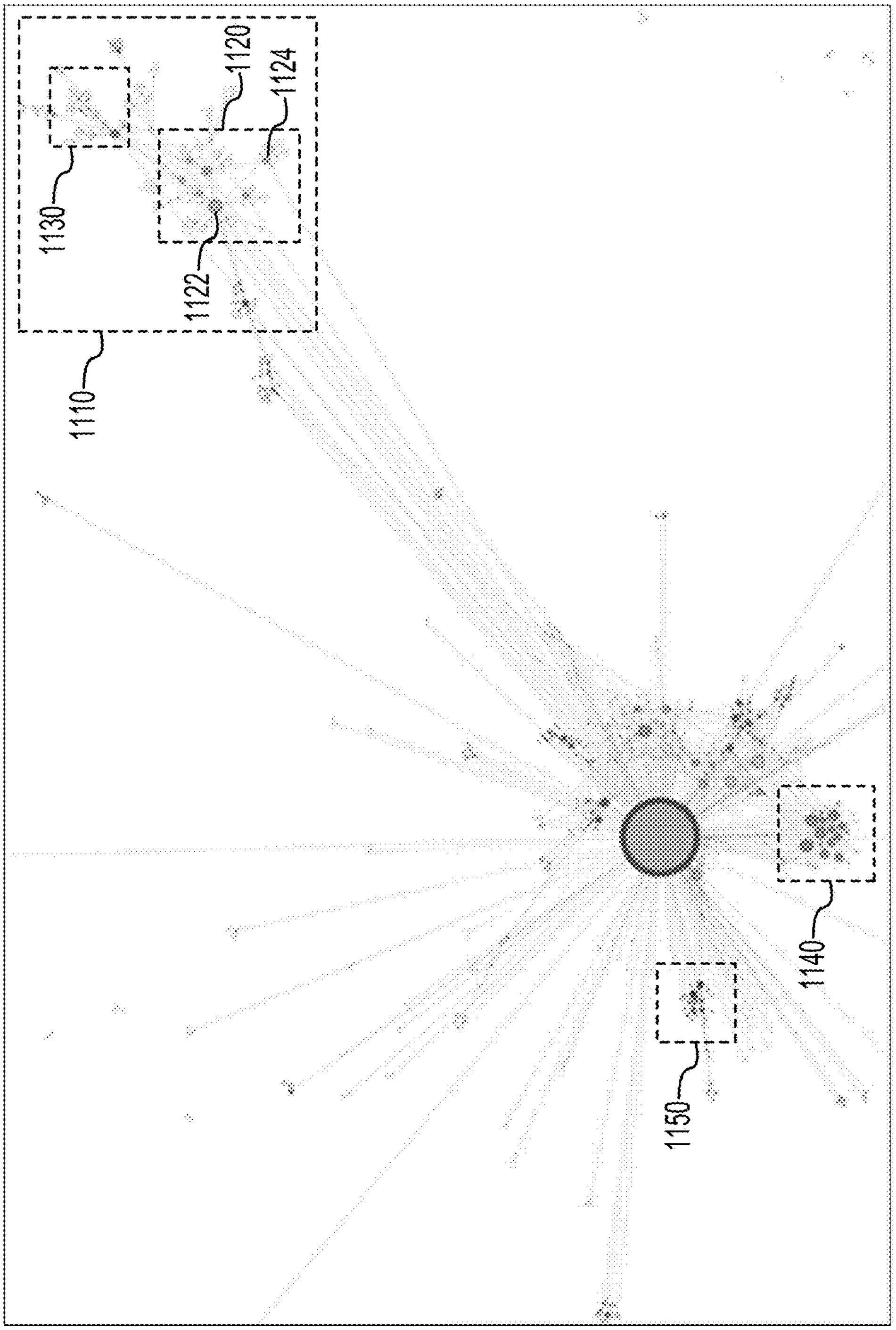
FIG. 11 shows a transition graph in accordance with one example.

FIGS. 10 and 11 show an example of generating a transition graph 1000 based on already-collected but not yet connected data. In this example, already-collected but not yet connected data may include data gathered by a search engine, such as Bing®, as part of the normal operation of Bing® as a service (provided via a cloud infrastructure). Transition graph 1100 may concern automotive entities, including automotive brands, such as Lamborghini, Maserati, Mercedes-Benz, Nissan, Honda, Toyota, GM, and Chrysler, etc. Each automotive entity may be represented by a node and transitions from one node to another may be recorded based on the actions of the users, such as querying for a car model, clicking on a link, or clicking on an advertisement. As an example, FIG. 10 shows a search engine example 1000, having a user interface 1010, including a search window 1012. Users may search for any of the models of cars, trucks, or SUVs offered by any of these entities. Users may click on advertisements (e.g., 1014). Users may also click on any of the clickable links (e.g., 1016) or other user interface elements that may be interactive. Successive actions by the users may add weight to the links between entities. As an example, if a user searches for Lamborghini and then clicks on Mercedes-Benz, then the weight of the link between the Lamborghini node and the Mercedes-Benz node may incremented by a unit. Similarly, a search query for Mercedes-Benz after the user clicks on Lamborghini may result in incrementing of the weight by another unit. A subset of the graph formed by such nodes is shown as transition graph 1100 in FIG. 11. A community 1110 may represent a set of automotive entities that the users are more likely to switch among. Thus, a set of automotive entities that may be classified as European luxury cars may correspond to the community 1110. Community 1110 may further include sub-communities, such as sports cars 1120 and SUVs 1130. The sports cars sub-community may include nodes corresponding to automotive entities, such as Lamborghini 1122 and Maserati 1124. Other communities may also be observed as part of transition graph 1100, including community 1140 and community 1150. Graph embedding techniques may be applied to transition graph 1100 to generate metric space data (for example, as described earlier with respect to FIG. 8), which may be further analyzed.

Figure 12:
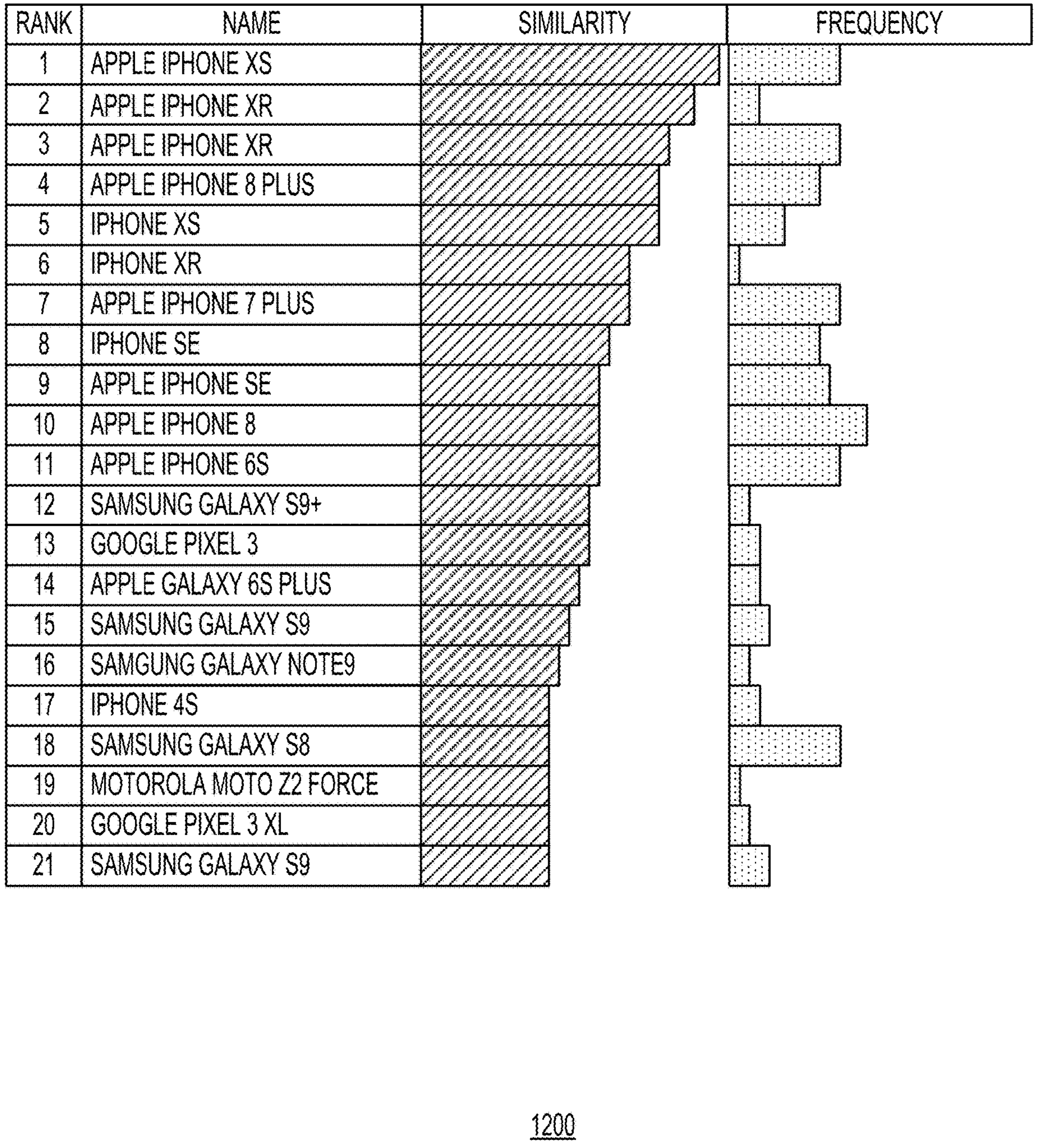
FIGS. 12, 13, and 14 show diagrams related to search recommendations based on graph embedding in accordance with one example.
Figure 13:
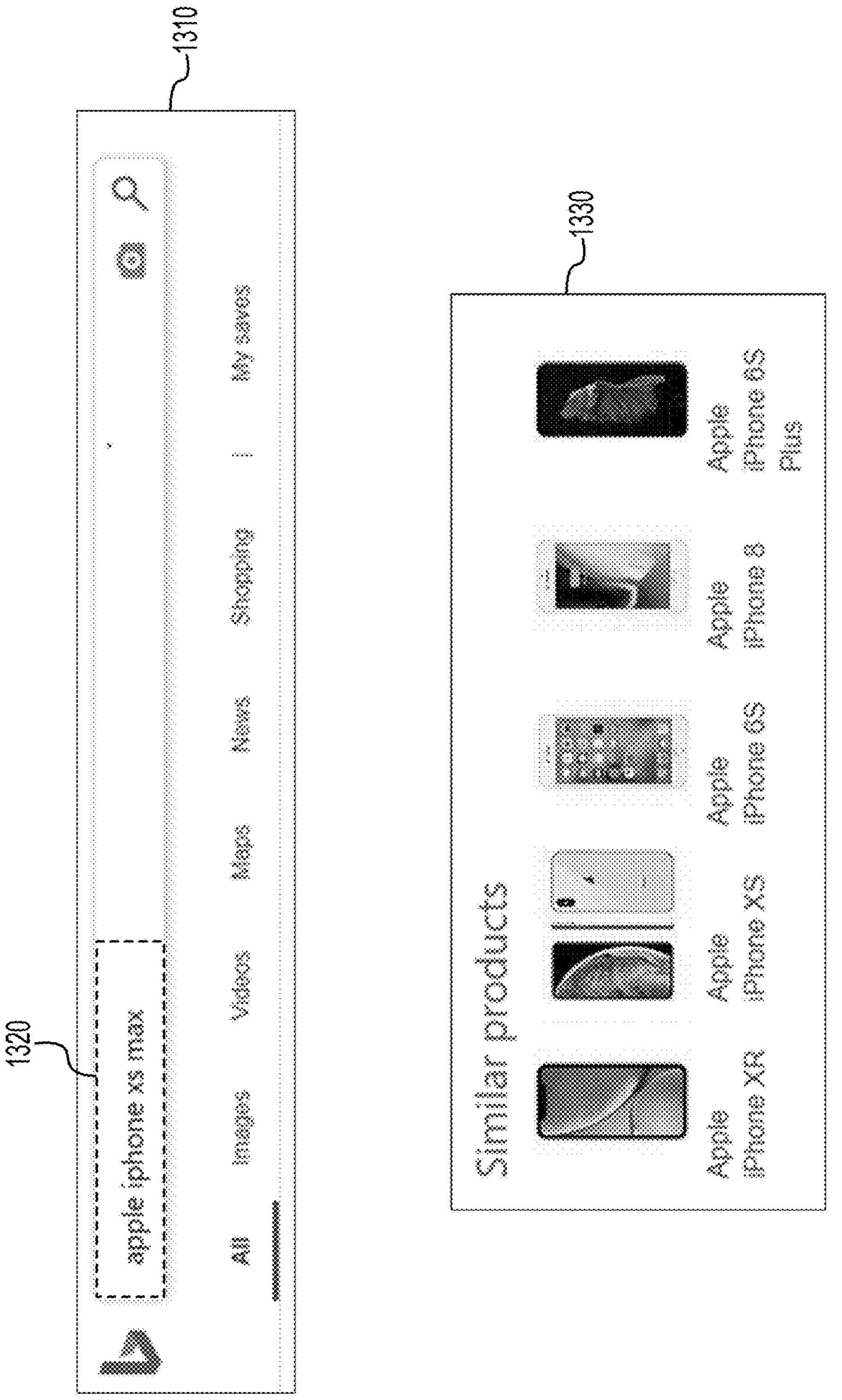

In one example, a metric may be improved by using vertex nomination to support the target activity. For example, if the already-collected but not yet connected data shows that an actor performs an action that expresses an interest in an object/actor, then the system could help the user by using vertex nomination to recommend related objects/actors that might also be of interest (like query suggestions in a search engine or people suggestions in a social network). In an example, described with respect to FIGS. 12, 13, and 14, recommendations may be provided as a result of a search query submitted to a search engine. This example may include determining a degree of similarity among products by leveraging the already collected but not yet connected data, including, for example, search engine query log data. Thus, in this example, the search query log data may be used to create a knowledge graph based on entity transitions in search sessions. These transitions may include user activities related to users clicking on suggestions or advertisements or users performing follow-up search queries. Thus, as shown in FIG. 12, related entities view 1200 shows iPhone models that may have a high degree of similarity. The models may be ranked based on the degree of similarity. Data concerning frequency of the searches on the particular models may also be captured from the search engine query log data. Using this data, a search engine may, as shown in FIG. 13, in response to a query 1320 entered via a search field 1310 (or provided via other means, such as voice input etc.) display similar products. Thus, a search query "apple iPhone xs max" may produce the display portion 1330 showing similar products that have the highest rank in terms of the similarity that is determined using vertex nomination. As explained earlier, once the metric spaces have been created using the graph embeddings, the nearest neighbors to the node of interest in the space may be determined using vertex nomination. In one example, transformer 450 may include instructions configured to perform the steps associated with vertex nomination. The use of vertex nomination is not limited to product recommendations; other application areas may include comparing airlines etc.

Figure 14:
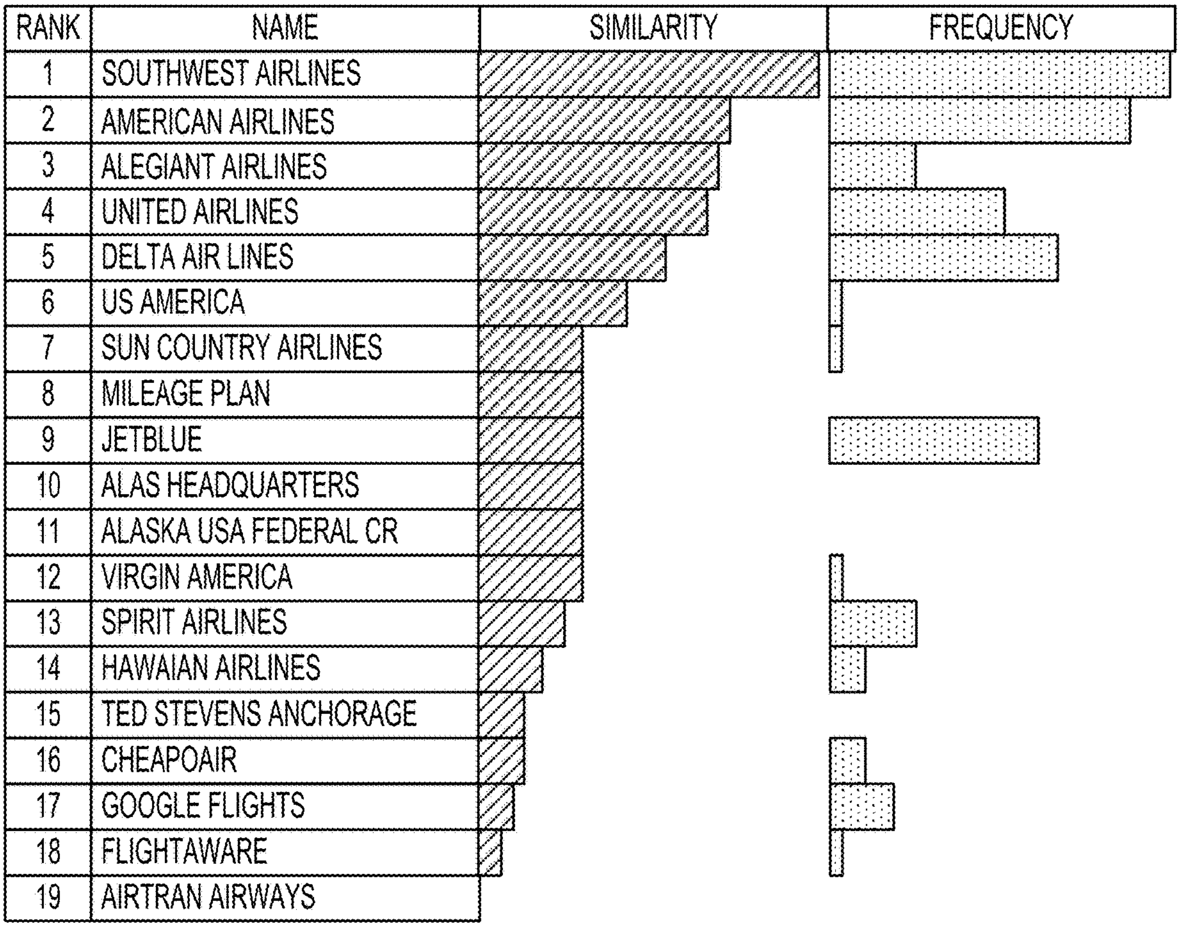

As another example, FIG. 14 shows related entities view 1400 concerning airlines. Thus, a search query for Alaska Airlines may produce a list of suggested airlines based on the ranking shown in FIG. 14. This ranking may similarly be based on the vertex nomination process applied to the search query log data for airlines' related searches. As before, the frequency of the searches on each airline may also be captured.

Figure 15:
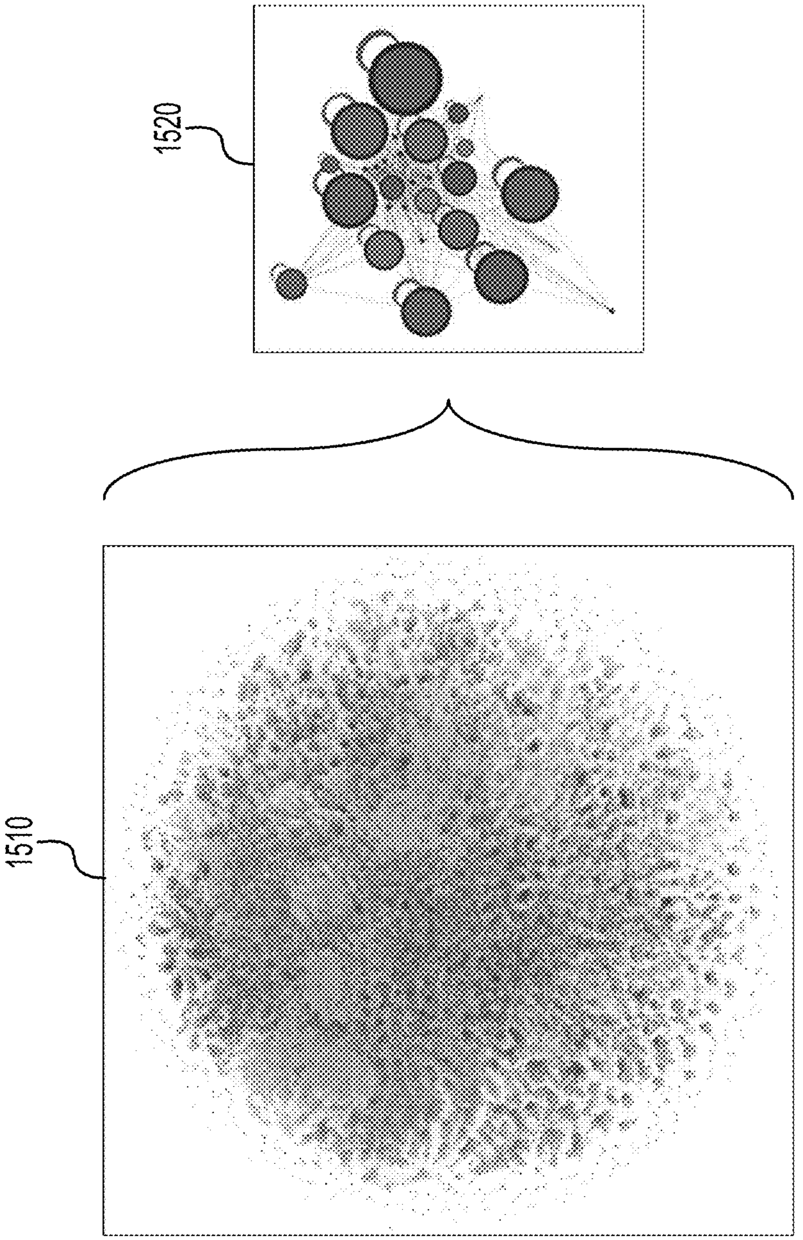
FIG. 15 shows a graph that represents the email exchanges among various users of an organization as an organization structure.
Figure 16:
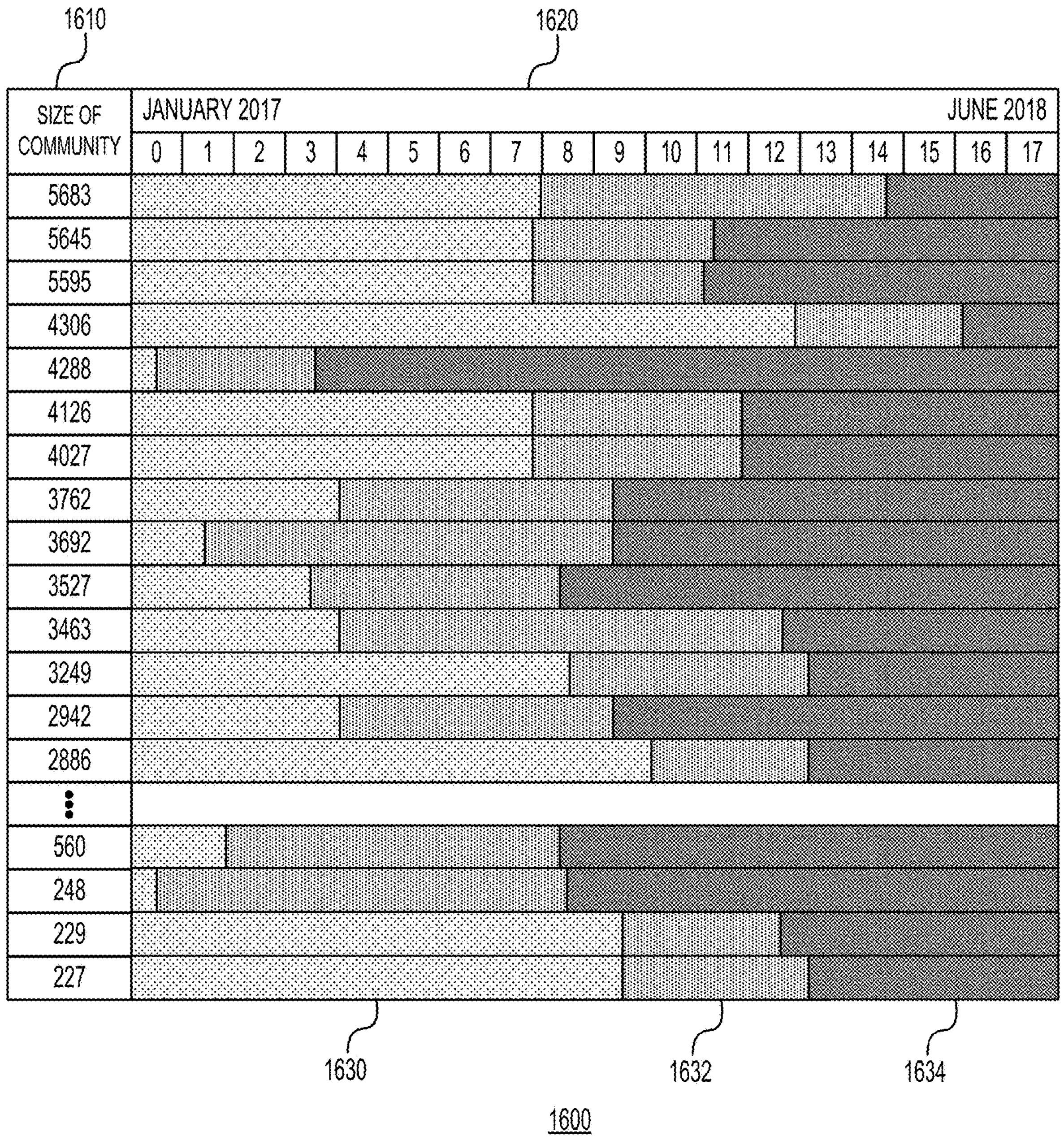
FIG. 16 shows a table illustrating adoption of a feature related to a product over time in accordance with one example.
Figure 17:
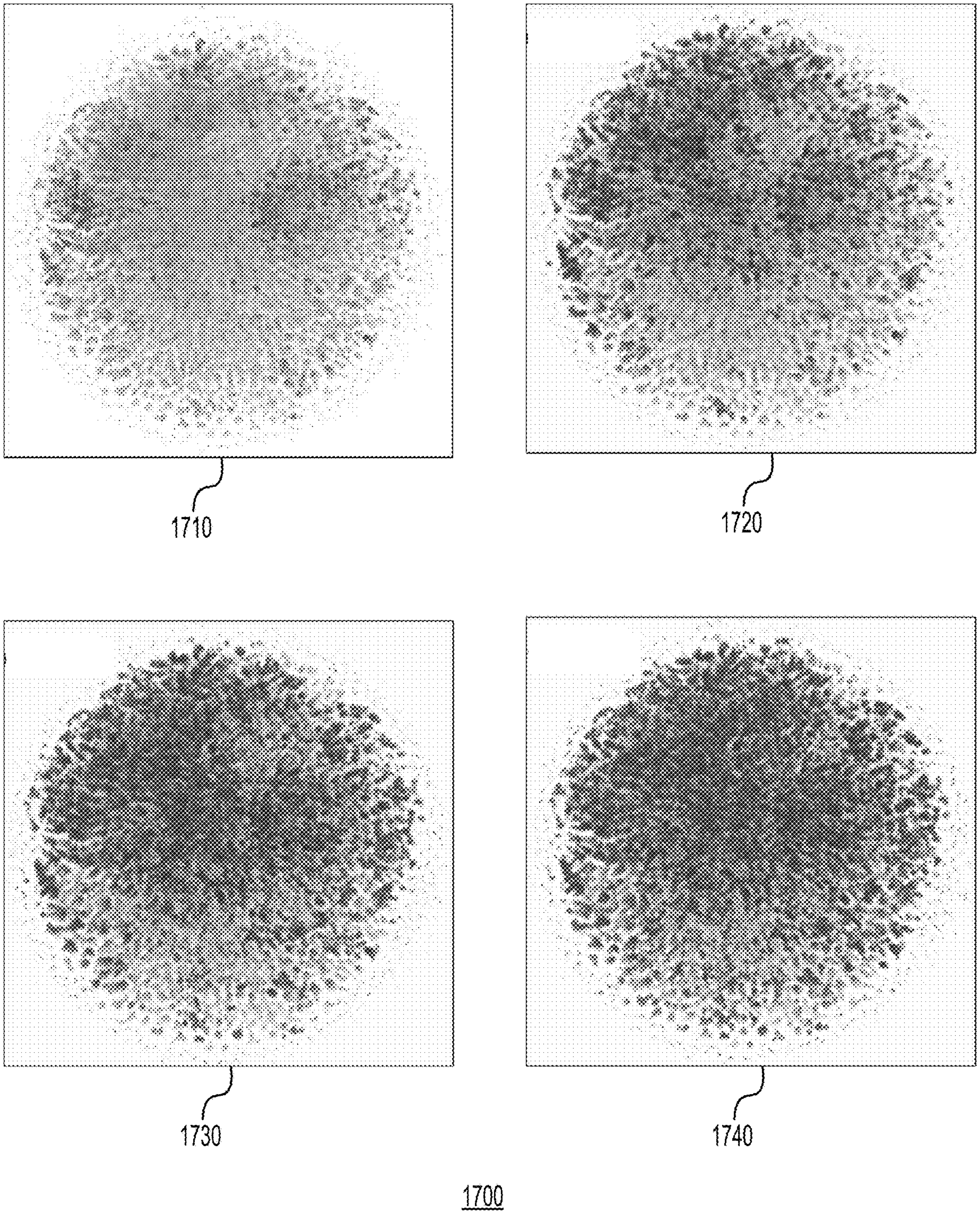
FIG. 17 shows community structure views that show the adoption of the feature over time in accordance with one example.

FIGS. 15, 16, and 17 show insights that one may derive by applying the techniques described in the present disclosure with respect to the adoption of a feature of an application or a service by the various communities over time. As an example, FIG. 15 shows a graph 1510 that represents the email exchanges among various users of an organization as an organization structure. Additional views, such as view 1520 of graph 1510, show a community structure at a higher level of granularity. Each of the nodes in view 1520 may represent a community of users that is inferred by analyzing the data corresponding to graph 1510 by using graph embedding techniques.

FIG. 16 shows a table 1600 illustrating adoption of a feature related to a product over time in accordance with one example. Column 1610 shows the size of the various communities that have been identified using the graph-theoretic techniques described herein. The adoption of the feature is shown over a time frame 1620 that extends from January 2017 to June 2018. Different shadings (e.g., 1630, 1632, and 1634) represent the extent of the adoption of the feature being investigated. FIG. 17 shows community structure views 1710, 1720, 1730, and 1740 that show the adoption of the feature over time.

Figure 18:
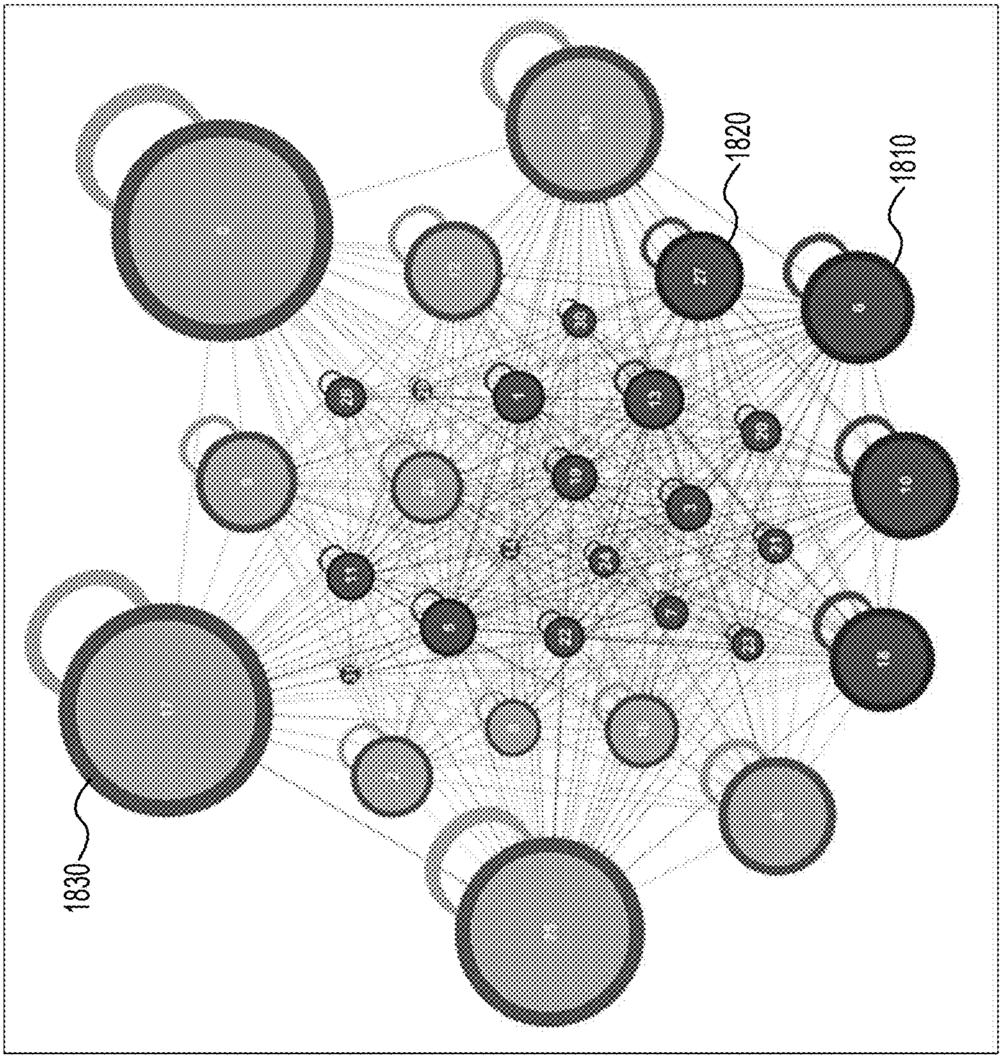
FIG. 18 shows a graph of various communities at a workplace in accordance with one example.

FIGS. 18-21 show the use of graph embedding techniques for workplace analytics. FIG. 18 shows a graph 1800 of various communities at a workplace. Transformer 450 may determine meaningful groups of related nodes (organized as communities in graph 1800) by performing spatial clustering (e.g., DBSCAN) of the nodes in the embedding space. Thus, in this example, graph 1800 shows communities 1810, 1820, and 1830. The links among communities indicate interactions among the communities. The metric space data corresponding to graph 1800 obtained using the techniques described earlier (e.g., node2vec) may be used to perform additional analytics. As an example, churn in the communities may be analyzed by observing the monthly change in the community memberships. A metric may be predicted at the graph and community levels using regression analysis over graph features including basic graph measures (e.g., size, radius, diameter), centrality measures (e.g., degree centrality, betweenness centrality, closeness centrality, eigenvector centrality, percolation centrality), connectivity measures (e.g., clustering coefficient, density), and dynamics measures (e.g., Omni stability, scan statistic). Appropriate supervised machine learning techniques for regression analysis include Artificial Neural Networks, Support Vector Machines, k-Nearest Neighbors (k-NN), and linear regression. Predictions may be used to explore the possible effects of activity interventions that transform the activity graph in specific ways (e.g., increasing community sizes or density). A metric driven by viral diffusion through the activity graph can be modeled and predicted using feature diffusion over the graph embedding. Possible interventions may include using predictions to target nodes in ways that accelerate or slow the diffusion process through the activity graph. The average community density could also be elevated to a high-level metric, which itself may be capable of two forms of diagnostic drill-down. Transformer 450 may perform a "structural drill-down" into the average density of a specific community over time and a "dynamics drill-down" into the density of that specific community in a specific time window. Transformer 450 may also perform a "dynamics drill-down" into the average density of all communities within a specific time window and a "structural drill-down" into the density of a specific community in that specific time window.

Figure 19:
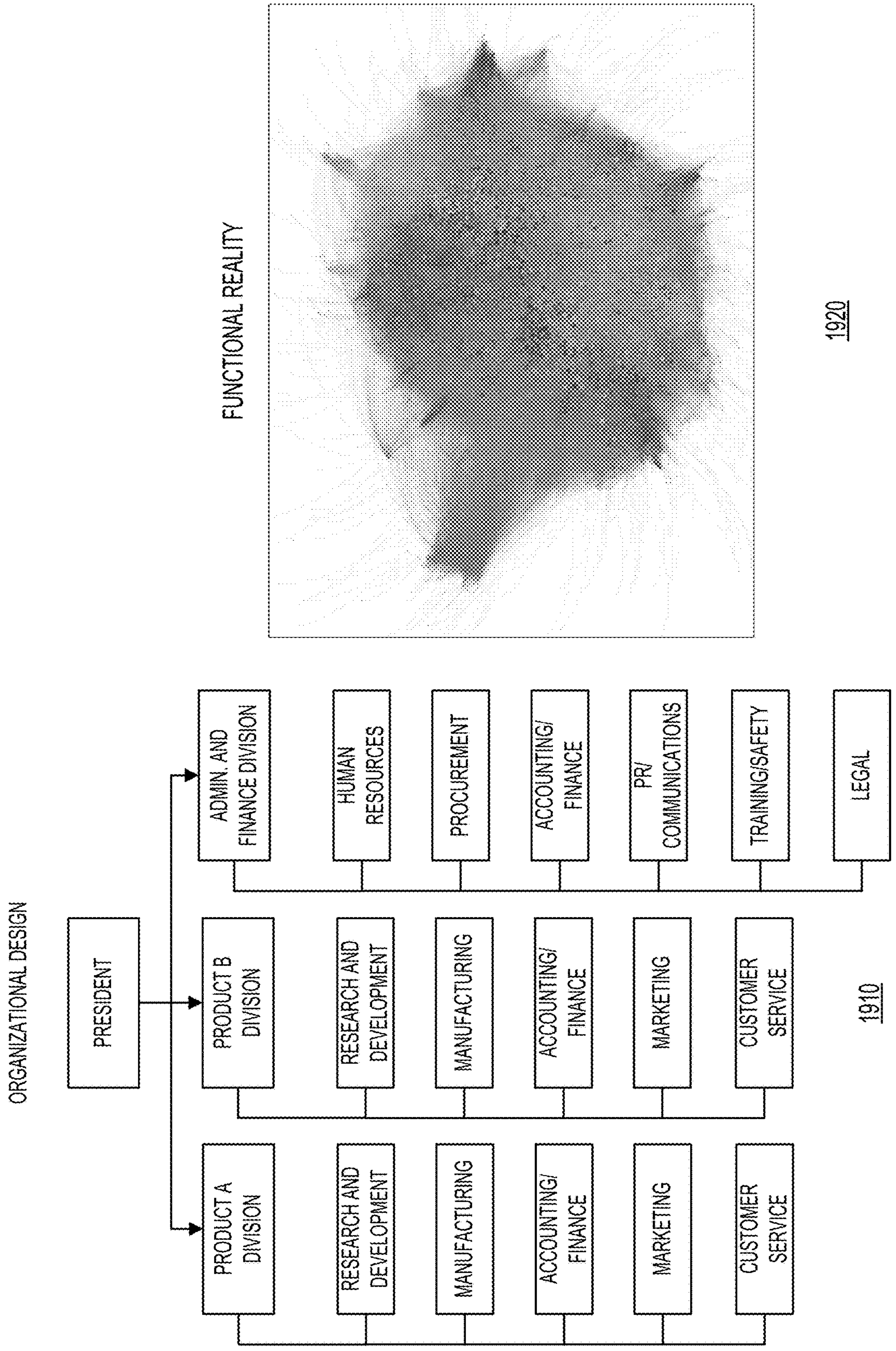
FIG. 19 shows diagrams of a conventional organization design and the organization's functional reality based on a graph induced from email telemetry data, which may be a subset of the already-collected but not yet connected data, in accordance with one example.

The already-collected but not yet connected data may include email telemetry data, which may be processed to gather insights into the workplace. As an example, FIG. 19 shows a conventional organization design 1910 and the organization's functional reality 1920 based on a graph induced from email telemetry data, which may be a subset of the already-collected but not yet connected data. Functional reality 1920 may include nodes representing people (e.g., employees) that are connected to each other via links that represent the email interactions among the people. The dark nodes in functional reality 1920 may represent people (e.g., employees) who are connected outside of their management hierarchy. Light gray nodes may present people that are operating within the silos of their reporting structure. Communities of the various types of nodes may be inferred using machine learning and the techniques described earlier. Siloed working conditions (e.g., represented by the communities or networks that mirror the hierarchy) may stifle innovation by fragmenting company knowledge and creating echo chambers. This analysis thus may provide insights to managers, including underscoring those communities that are bureaucratic and limit the autonomy and the effectiveness of the informal networks.

Figure 20:
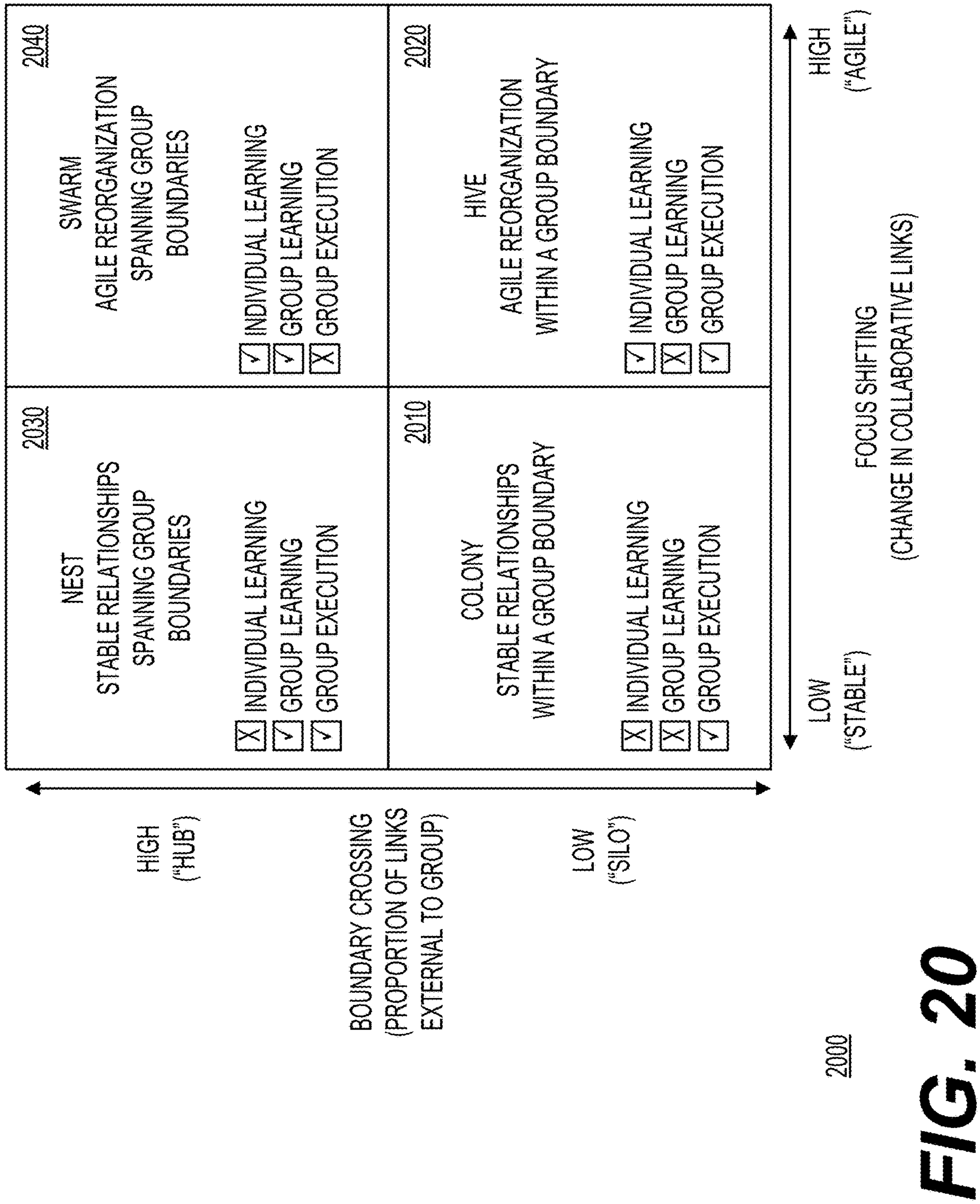
FIGS. 20 and 21 show a framework that illustrates certain attributes of a workplace in accordance with one example.
Figure 21:
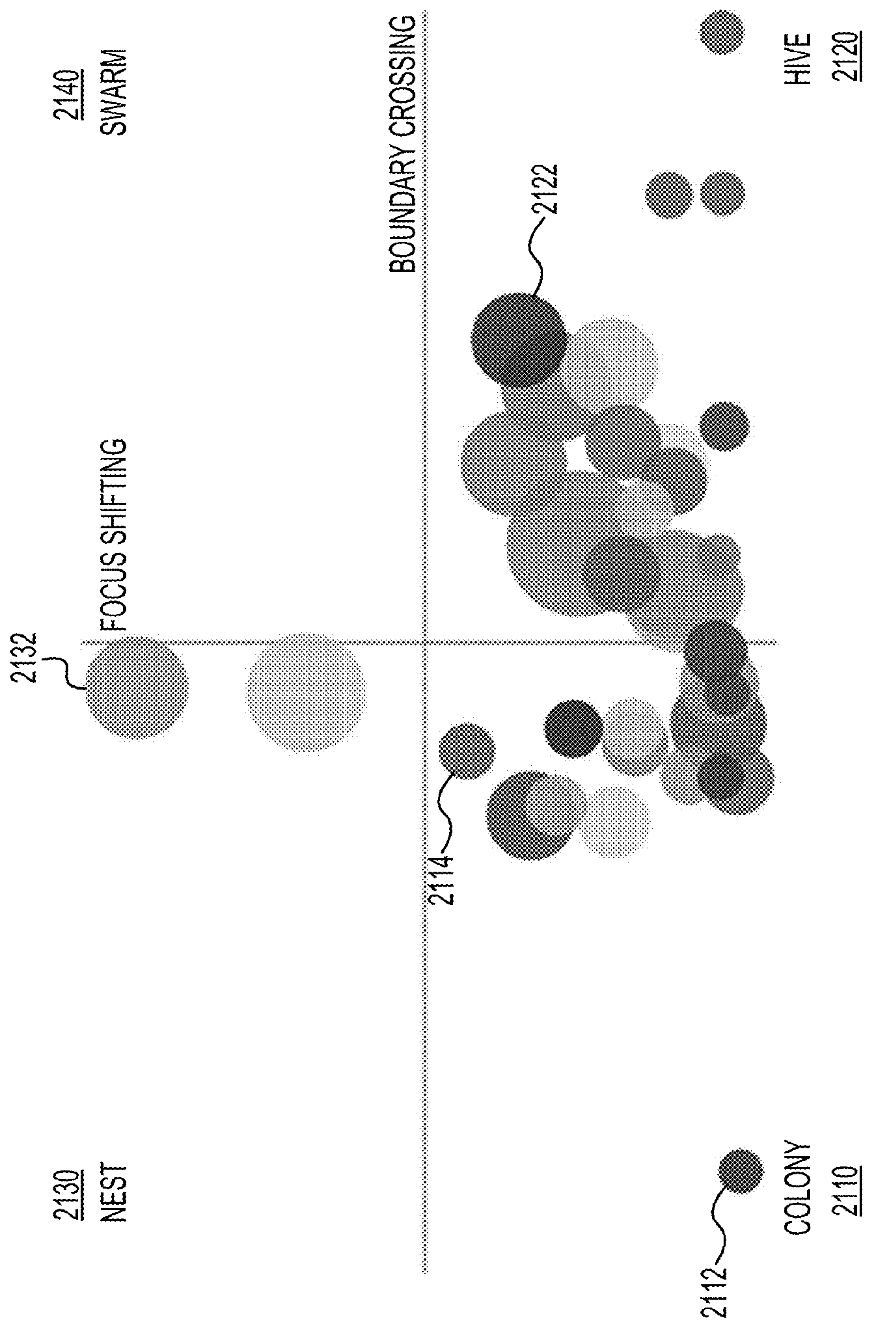

Additional insights into the workplace may be obtained by additional application of graph-theoretic techniques to the already-collected but not yet connected data. As an example, FIG. 20 shows a framework 2000 that illustrates certain attributes of a workplace. Framework 2000 includes a horizontal axis representative of the fluidity of the collaborative links and a vertical axis representative of the proportion of the links that are external to a group. The fluidity of the collaborative links is based on the Omni score based on the embedding of multiple graphs into the same dimensions. The degree of the changes in the collaborative links may represent focus shifting. The proportion of the links that are external to the group may indicate boundary crossing by employees. The proportion of the links that are external to the group may referred to as "freedom to collaborate across the organization" and is based on an analysis of the alignment between the community members and the organizational hierarchy. The calculation involves computing the minimum spanning tree (MST) of all community members, adding all MST nodes to a peer set, adding all peers of all MST nodes to the peer set (except for peers of the MST root node), and calculating alignment as the ratio (community size)/(peer set size), and freedom to collaborate across the organization as 1—alignment. Framework 2000 includes four quadrants that classify the workplace into a colony 2010, hive 2020, nest 2030, or swarm 2040. Colony 2010 may relate to a workplace community that has stable relationships within the group. Hive 2020 may represent a workplace community that has agile reorganization within a group boundary. Nest 2030 may relate to stable relationships spanning group boundaries. Swarm 2040 may relate to agile reorganization spanning group boundaries. Attributes, such as individual learning, group learning, and group execution, for these groups are also identified in FIG. 20. FIG. 21 shows another framework 2100 for investigating similar workplace analytics. Framework 2100 also shows the degree of the changes in the collaborative links represented as focus shifting and the proportion of the links that are external to the group represented as boundary crossing by employees. Framework 2100 includes the same four quadrants as in FIG. 20 that classify the workplace into a colony 2110, hive 2120, nest 2130, or swarm 2140. Groups 2112 and 2114 are shown as having the attributes associated with a colony; group 2122 is shown as having the attributes associated with a hive; group 2132 is shown as a group having most of the employees having attributes associated with a nest and having a small number of employees having attributes associated with a swarm.

Additional examples of analytics may relate to decreasing cybercrime. With many forms of cybercrime, the challenge is to find the connections between disparate pieces of evidence. A conventional investigative workflow is for investigators to manually piece together related evidence into cases built around a single identifying characteristic (e.g., a phone number), and for progress to be measured in terms of cases processed over time. Such an approach can fail to integrate all related evidence in ways that misrepresent the potential impact of tackling each case. To see the connected nature of such cybercriminal activity, we can create an undirected weighted graph in which nodes are evidential "fingerprints" associated with the perpetrator (e.g., a direct identifier like an alias, phone number or email address, or an indirect identifier like characteristic language or image use), edges represent co-occurrence of fingerprints in individual pieces of evidence, and edge weights correspond to the frequency of co-occurrence. The result is the creation of many separate subgraphs (connected components) that allow instances of cybercrime to be organized into distinct operations. This organization of evidence aligns with the prior notion of a case and the metrics of cases tackled per unit time.

The graph-like organization of evidence also enables new, graph-theoretic metrics of crime sophistication to be used to prioritize investigative and law enforcement efforts. Evidential fingerprints can be measured and ranked not just by frequency but by degree (number of connected fingerprints) and operations sized not just by number of fingerprints but by graph diameter (longest sequence of connected fingerprints). Variations in the graph-theoretic attributes of scam operations over time can also be used to monitor and describe the changing tactics of cybercriminals in ways that would not otherwise be possible. The technique of graph matching can also be used to identify connected components with similar structure that could indicate generation by a common automated process.

Given the use of similarity measures to define graph edges, the use of different similarity thresholds will create different graph structures. Different graphs (and hence ranked lists of operations) can be systematically generated for different similarity thresholds as a way for users to quickly identify the most promising graphs for analysis. Over time, user feedback about the quality of matched fingerprints (e.g., by rejecting false matches) can be used to dynamically vary such thresholds.

In conclusion, the present disclosure relates a method implemented by a system comprising at least one processor and at least one memory. The method may include collecting data for a target activity relating to an actor or an object during normal operation of a cloud computing platform to generate a set of already-collected but not yet connected data and storing the set of the already-collected but not yet connected data in the at least one memory. The method may further include using the at least one processor, extracting at least one of a first set of actor-related data, a second set of object-related data, and a third set of temporal data from the set of the already-collected but not yet connected data representative of a unit-level contribution to the target activity. The method may further include using the at least one processor, generating graph data for at least one graph having a plurality of nodes and a plurality of edges using the set of the already-collected but not yet connected data, where each of the plurality of nodes corresponds to the actor or the object, and where an attribute associated with each of the plurality of edges corresponds to a measurement associated with the target activity during a temporal dimension of interest. The method may further include using the at least one processor, converting the graph data into metric space data using a graph embedding process and storing the metric space data in the at least one memory.

The collecting the data for the target activity may comprise collecting application logs related data, activity logs related data, and streaming data related to the actor or the object during the normal operation of the cloud computing platform. The converting the graph data into the metric space data using the graph embedding process may further comprise: (1) using spectral embedding, or (2) representing a node included in the graph data in terms of a neighborhood of other nodes that are likely to be reached based on taking fixed-length random walks from the node. A final representation of the node may be based on an aggregation of a plurality of fixed-length random walks from the node when the graph embedding process comprises representing the node included in the graph data in terms of the neighborhood of the other nodes.

The converting the graph data into the metric space data using the graph embedding process may further comprise performing dimensionality reduction by replacing discrete edge relations with a distance-based measure.

The already-collected but not yet connected data may comprise search query data collected by a search engine during a normal operation of the search engine. The already-collected but not yet connected data may comprise a first log comprising records representing indicia of email interactions among a set of actors collected during a normal operation of an email service or a second log comprising records representing indicia of messaging interactions among a second set of actors during a normal operation of a collaboration application or a messaging application.

In another example, the present disclosure relates to a method implemented by a system comprising at least one processor and at least one memory. The method may include collecting data for a target activity relating to an actor or an object to generate a set of already-collected but not yet connected data and storing the set of the already-collected but not yet connected data in the at least one memory. The method may further include using the at least one processor, extracting a set of actor-related data from the set of the already-collected but not yet connected data representative of a unit-level contribution to the target activity. The method may further include using the at least one processor, generating graph data for at least one graph having a plurality of nodes and a plurality of edges using the set of the already-collected but not yet connected data, where each of the plurality of nodes corresponds to the actor, and where an attribute associated with each of the plurality of edges corresponds to a measurement associated with the target activity during a temporal dimension of interest. The method may further include using the at least one processor, converting the graph data into metric space data using a graph embedding process and storing the metric space data in the at least one memory.

The collecting the data for the target activity may comprise collecting application logs related data, activity logs related data, and streaming data related to the actor or the object during the normal operation of the cloud computing platform. The converting the graph data into the metric space data using the graph embedding process may further comprise: (1) using spectral embedding, or (2) representing a node included in the graph data in terms of a neighborhood of other nodes that are likely to be reached based on taking fixed-length random walks from the node. A final representation of the node may be based on an aggregation of a plurality of fixed-length random walks from the node when the graph embedding process comprises representing the node included in the graph data in terms of the neighborhood of the other nodes.

The converting the graph data into the metric space data using the graph embedding process may further comprise performing dimensionality reduction by replacing discrete edge relations with a distance-based measure.

The already-collected but not yet connected data may comprise search query data collected by a search engine during a normal operation of the search engine. The already-collected but not yet connected data may comprise a first log comprising records representing indicia of email interactions among a set of actors collected during a normal operation of an email service or a second log comprising records representing indicia of messaging interactions among a second set of actors during a normal operation of a collaboration application or a messaging application.

In yet another example, the present disclosure relates to a system comprising at least one processor and at least one memory. The at least one memory may include instructions configured to, when executed by the at least one processor, collect data for a target activity relating to an actor or an object to generate a set of already-collected but not yet connected data and storing the set of the already-collected but not yet connected data in the at least one memory. The at least one memory may further include instructions configured to, when executed by the at least one processor, extract a set of actor-related data from the set of the already-collected but not yet connected data representative of a unit-level contribution to the target activity. The at least one memory may further include instructions configured to, when executed by the at least one processor, generate graph data for at least one graph having a plurality of nodes and a plurality of edges using the set of the already-collected but not yet connected data, where each of the plurality of nodes corresponds to the actor, and where an attribute associated with each of the plurality of edges corresponds to a measurement associated with the target activity during a temporal dimension of interest. The at least one memory may further include instructions configured to, when executed by the at least one processor, convert the graph data into metric space data using a graph embedding process and storing the metric space data in the at least one memory.

The instructions configured to collect the data for the target activity may further comprise instructions configured to collect application logs related data, activity logs related data, and streaming data related to the actor or the object during the normal operation of the cloud computing platform. The instructions configured to convert the graph data into the metric space data using the graph embedding process may further comprise: (1) instructions for using spectral embedding, or (2) instructions configured to representing a node included in the graph data in terms of a neighborhood of other nodes that are likely to be reached based on taking fixed-length random walks from the node. A final representation of the node may be based on an aggregation of a plurality of fixed-length random walks from the node when the instructions configured to representing a node included in the graph data in terms of a neighborhood of other nodes are used.

The already-collected but not yet connected data may comprise search query data collected by a search engine during a normal operation of the search engine. The already-collected but not yet connected data may comprise a first log comprising records representing indicia of email interactions among a set of actors collected during a normal operation of an email service or a second log comprising records representing indicia of messaging interactions among a second set of actors during a normal operation of a collaboration application or a messaging application.

In another example, the present disclosure relates to a method implemented by a system comprising at least one processor and at least one memory. The method may include collecting data for a target activity relating to an actor or an object during normal operation of a cloud computing platform to generate a set of already-collected but not yet connected data and storing the set of the already-collected but not yet connected data in the at least one memory. The method may further include using the at least one processor, extracting at least one of a first set of actor-related data, a second set of object-related data, and a third set of temporal data from the set of the already-collected but not yet connected data representative of a unit-level contribution to the target activity. The method may further include using the at least one processor, generating graph data for at least one graph having a plurality of nodes and a plurality of edges using the set of the already-collected but not yet connected data, where each of the plurality of nodes corresponds to the actor or the object, and where an attribute associated with each of the plurality of edges corresponds to a measurement associated with the target activity during a temporal dimension of interest. The method may further include using the at least one processor, modeling a relationship between graph attributes associated with the graph data and at least one higher-level metric associated with the target activity.

The collecting the data for the target activity may comprise collecting application logs related data, activity logs related data, and streaming data related to the actor or the object during the normal operation of the cloud computing platform. The modeling a relationship between graph attributes associated with the graph data and the at least one higher-level metric associated with the target activity may comprise using supervised learning to infer a relationship between at least one attribute associated with the at least one graph and the at least one higher-level metric. The at least one attribute may be selected from a group comprising a size of the at least one graph, a radius of the at least one graph, a diameter of the at least one graph, a centrality related measure associated with each of nodes of the at least one graph, a connectivity measure associated with the at least one graph, a clustering measure associated with the at least one graph, a density measure associated with the at least one graph, and a dynamic measure associated with the at least one graph. The method may further comprise converting the graph data into metric space data using a graph embedding process prior to modeling the relationship between the graph attributes associated with the graph data and the at least one higher-level metric associated with the target activity.

The already-collected but not yet connected data may comprise search query data collected by a search engine during a normal operation of the search engine. The already-collected but not yet connected data may comprise a first log comprising records representing indicia of email interactions among a set of actors collected during a normal operation of an email service or a second log comprising records representing indicia of messaging interactions among a second set of actors during a normal operation of a collaboration application or a messaging application.

In another example, the present disclosure relates to a method implemented by a system comprising at least one processor and at least one memory. The method may include collecting data for a target activity relating to an actor or an object to generate a set of already-collected but not yet connected data and storing the set of the already-collected but not yet connected data in the at least one memory. The method may further include using the at least one processor, extracting a set of actor-related data from the set of the already-collected but not yet connected data representative of a unit-level contribution to the target activity. The method may further include using the at least one processor, generating graph data for at least one graph having a plurality of nodes and a plurality of edges using the set of the already-collected but not yet connected data, where each of the plurality of nodes corresponds to the actor, and where an attribute associated with each of the plurality of edges corresponds to a measurement associated with the target activity during a temporal dimension of interest. The method may further include using the at least one processor, modeling a relationship between graph attributes associated with the graph data and at least one higher-level metric associated with the target activity.

The collecting the data for the target activity may comprise collecting application logs related data, activity logs related data, and streaming data related to the actor or the object during the normal operation of the cloud computing platform. The modeling a relationship between graph attributes associated with the graph data and the at least one higher-level metric associated with the target activity may comprise using supervised learning to infer a relationship between at least one attribute associated with the at least one graph and the at least one higher-level metric. The at least one attribute may be selected from a group comprising a size of the at least one graph, a radius of the at least one graph, a diameter of the at least one graph, a centrality related measure associated with each of nodes of the at least one graph, a connectivity measure associated with the at least one graph, a clustering measure associated with the at least one graph, a density measure associated with the at least one graph, and a dynamic measure associated with the at least one graph. The method may further comprise converting the graph data into metric space data using a graph embedding process prior to modeling the relationship between the graph attributes associated with the graph data and the at least one higher-level metric associated with the target activity.

The already-collected but not yet connected data may comprise search query data collected by a search engine during a normal operation of the search engine. The already-collected but not yet connected data may comprise a first log comprising records representing indicia of email interactions among a set of actors collected during a normal operation of an email service or a second log comprising records representing indicia of messaging interactions among a second set of actors during a normal operation of a collaboration application or a messaging application.

In yet another example, the present disclosure relates to a system comprising at least one processor and at least one memory. The at least one memory may include instructions configured to, when executed by the at least one processor, collect data for a target activity relating to an actor or an object to generate a set of already-collected but not yet connected data and storing the set of the already-collected but not yet connected data in the at least one memory. The at least one memory may further include instructions configured to, when executed by the at least one processor, extract a set of actor-related data from the set of the already-collected but not yet connected data representative of a unit-level contribution to the target activity. The at least one memory may further include instructions configured to, when executed by the at least one processor, generate graph data for at least one graph having a plurality of nodes and a plurality of edges using the set of the already-collected but not yet connected data, where each of the plurality of nodes corresponds to the actor, and where an attribute associated with each of the plurality of edges corresponds to a measurement associated with the target activity during a temporal dimension of interest. The at least one memory may further include instructions configured to, when executed by the at least one processor, model a relationship between graph attributes associated with the graph data and at least one higher-level metric associated with the target activity.

The instructions configured to collect the data for the target activity may further comprise instructions configured to collect application logs related data, activity logs related data, and streaming data related to the actor or the object during the normal operation of the cloud computing platform. The instructions configured to model the relationship between the graph attributes associated with the graph data and at least one higher-level metric associated with the target activity may comprise supervised learning instructions configured to infer a relationship between at least one attribute associated with the at least one graph and the at least one higher-level metric. The at least one attribute may be selected from a group comprising a size of the at least one graph, a radius of the at least one graph, a diameter of the at least one graph, a centrality related measure associated with each of nodes of the at least one graph, a connectivity measure associated with the at least one graph, a clustering measure associated with the at least one graph, a density measure associated with the at least one graph, and a dynamic measure associated with the at least one graph.

The already-collected but not yet connected data may comprise search query data collected by a search engine during a normal operation of the search engine. The already-collected but not yet connected data may comprise a first log comprising records representing indicia of email interactions among a set of actors collected during a normal operation of an email service or a second log comprising records representing indicia of messaging interactions among a second set of actors during a normal operation of a collaboration application or a messaging application.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method implemented by a system comprising at least one processor and at least one memory, the method comprising:

collecting data for a target activity relating to an actor or an object during normal operation of a cloud computing platform to generate a set of already-collected but not yet connected data and storing the set of the already-collected but not yet connected data in the at least one memory;

using the at least one processor, extracting at least one of a first set of actor-related data, a second set of object-related data, and a third set of temporal data from the set of the already-collected but not yet connected data representative of a unit-level contribution to the target activity;

using the at least one processor, generating graph data for at least one graph having a plurality of nodes and a plurality of edges using the set of the already-collected but not yet connected data, wherein each of the plurality of nodes corresponds to the actor or the object, and wherein an attribute associated with each of the plurality of edges corresponds to a measurement associated with the target activity during a temporal dimension of interest; and using the at least one processor, modeling a relationship between graph attributes associated with the graph data and at least one higher-level metric associated with the target activity, wherein the method further comprises, prior to the modeling of the relationship between the graph attributes associated with the graph data and the at least one higher-level metric associated with the target activity, converting the graph data into metric space data using a graph embedding process.

2. The method of claim 1, wherein the collecting the data for the target activity comprises collecting application logs related data, activity logs related data, and streaming data related to the actor or the object during the normal operation of the cloud computing platform.

3. The method of claim 1, wherein the modeling a relationship between graph attributes associated with the graph data and the at least one higher-level metric associated with the target activity comprises using supervised learning to infer a relationship between at least one attribute associated with the at least one graph and the at least one higher-level metric.

4. The method of claim 3, wherein the at least one attribute is selected from a group comprising a size of the at least one graph, a radius of the at least one graph, a diameter of the at least one graph, a centrality related measure associated with each of nodes of the at least one graph, a connectivity measure associated with the at least one graph, a clustering measure associated with the at least one graph, a density measure associated with the at least one graph, and a dynamic measure associated with the at least one graph.

5. The method of claim 1, wherein the converting the graph data into the metric space data using the graph embedding process further comprises at least one of: (1) using spectral embedding, (2) representing a node included in the graph data in terms of a neighborhood of other nodes that are likely to be reached based on taking fixed-length random walks from the node, or (3) performing dimensionality reduction by replacing discrete edge relations with a distance-based measure.

6. The method of claim 1, wherein the already-collected but not yet connected data comprises search query data collected by a search engine during a normal operation of the search engine.

7. The method of claim 1, wherein the already-collected but not yet connected data comprises at least one of a first log comprising records representing indicia of email interactions among a first set of actors collected during a normal operation of an email service or a second log comprising records representing indicia of messaging interactions among a second set of actors during a normal operation of a collaboration application or a messaging application.

8. A method implemented by a system comprising at least one processor and at least one memory, the method comprising:

collecting data for a target activity relating to an actor or an object to generate a set of already-collected but not yet connected data and storing the set of the already-collected but not yet connected data in the at least one memory;

using the at least one processor, extracting a set of actor-related data from the set of the already-collected but not yet connected data representative of a unit-level contribution to the target activity;

using the at least one processor, generating graph data for at least one graph having a plurality of nodes and a plurality of edges using the set of the already-collected but not yet connected data, wherein each of the plurality of nodes corresponds to the actor, and wherein an attribute associated with each of the plurality of edges corresponds to a measurement associated with the target activity during a temporal dimension of interest; and using the at least one processor, modeling a relationship between graph attributes associated with the graph data and at least one higher-level metric associated with the target activity, wherein the method further comprises, prior to the modeling of the relationship between the graph attributes associated with the graph data and the at least one higher-level metric associated with the target activity, converting the graph data into metric space data using a graph embedding process.

9. The method of claim 8, wherein the collecting the data for the target activity comprises collecting application logs related data, activity logs related data, and streaming data related to the actor or the object during the normal operation of the cloud computing platform.

10. The method of claim 8, wherein the modeling the relationship between the graph attributes associated with the graph data and the at least one higher-level metric associated with the target activity comprises using supervised learning to infer a relationship between at least one attribute associated with the at least one graph and the at least one higher-level metric.

11. The method of claim 10, wherein the at least one attribute is selected from a group comprising a size of the at least one graph, a radius of the at least one graph, a diameter of the at least one graph, a centrality related measure associated with each of nodes of the at least one graph, a connectivity measure associated with the at least one graph, a clustering measure associated with the at least one graph, a density measure associated with the at least one graph, and a dynamic measure associated with the at least one graph.

12. The method of claim 8, wherein converting the graph data into the metric space data using the graph embedding process further comprises at least one of: (1) using spectral embedding, (2) representing a node included in the graph data in terms of a neighborhood of other nodes that are likely to be reached based on taking fixed-length random walks from the node, or (3) performing dimensionality reduction by replacing discrete edge relations with a distance-based measure.

13. The method of claim 8, wherein the already-collected but not yet connected data comprises search query data collected by a search engine during a normal operation of the search engine.

14. The method of claim 8, wherein the already-collected but not yet connected data comprises at least one of a first log comprising records representing indicia of email interactions among a set of actors collected during a normal operation of an email service or a second log comprising records representing indicia of messaging interactions among a second set of actors during a normal operation of a collaboration application or a messaging application.

15. A system comprising at least one processor and at least one memory, the at least one memory comprising:

instructions configured to, when executed by the at least one processor, collect data for a target activity relating to an actor or an object to generate a set of already-collected but not yet connected data and storing the set of the already-collected but not yet connected data in the at least one memory;

instructions configured to, when executed by the at least one processor, extract a set of actor-related data from the set of the already-collected but not yet connected data representative of a unit-level contribution to the target activity;

instructions configured to, when executed by the at least one processor, generate graph data for at least one graph having a plurality of nodes and a plurality of edges using the set of the already-collected but not yet connected data, wherein each of the plurality of nodes corresponds to the actor, and wherein an attribute associated with each of the plurality of edges corresponds to a measurement associated with the target activity during a temporal dimension of interest; and instructions configured to, when executed by the at least one processor, first convert the graph data into metric space data using a graph embedding process and then second model a relationship between graph attributes associated with the graph data and at least one higher-level metric associated with the target activity.

16. The system of claim 15, wherein the instructions configured to collect the data for the target activity further comprises instructions configured to collect application logs related data, activity logs related data, and streaming data related to the actor or the object during the normal operation of the cloud computing platform.

17. The system of claim 15, wherein the instructions configured to model the relationship between the graph attributes associated with the graph data and at least one higher-level metric associated with the target activity comprise supervised learning instructions configured to infer a relationship between at least one attribute associated with the at least one graph and the at least one higher-level metric.

18. The system of claim 17, wherein the at least one attribute is selected from a group comprising a size of the at least one graph, a radius of the at least one graph, a diameter of the at least one graph, a centrality related measure associated with each of nodes of the at least one graph, a connectivity measure associated with the at least one graph, a clustering measure associated with the at least one graph, a density measure associated with the at least one graph, and a dynamic measure associated with the at least one graph.

19. The system of claim 15, wherein the already-collected but not yet connected data comprises search query data collected by a search engine during a normal operation of the search engine.

20. The system of claim 15, wherein the already-collected but not yet connected data comprises a log comprising records representing indicia of email interactions among a set of actors collected during a normal operation of an email service.

* * * * *